US010234552B1

(12) United States Patent
Jazayeri et al.

(10) Patent No.: US 10,234,552 B1
(45) Date of Patent: Mar. 19, 2019

(54) PRECISE INFRASTRUCTURE MAPPING USING FULL-WAVEFORM INVERSION OF GROUND PENETRATING RADAR SIGNALS

(71) Applicants: Sajad Jazayeri, Tampa, FL (US); Sarah Kruse, St. Petersburg, FL (US)

(72) Inventors: Sajad Jazayeri, Tampa, FL (US); Sarah Kruse, St. Petersburg, FL (US)

(73) Assignee: University of South Florida, Tampa, FL (US)

( * ) Notice: Subject to any disclaimer, the term of this patent is extended or adjusted under 35 U.S.C. 154(b) by 5 days.

(21) Appl. No.: 16/020,665

(22) Filed: Jun. 27, 2018

(51) Int. Cl.
  *G01S 3/786* (2006.01)
  *G01S 13/88* (2006.01)
  *G01S 7/295* (2006.01)
  *G01S 13/89* (2006.01)

(52) U.S. Cl.
  CPC ........... *G01S 13/885* (2013.01); *G01S 7/295* (2013.01); *G01S 13/89* (2013.01)

(58) Field of Classification Search
  CPC ........... G01S 13/003; G08B 13/19602; G08B 13/1961; H04N 5/23203
  USPC ........................................................ 342/22
  See application file for complete search history.

(56) References Cited

U.S. PATENT DOCUMENTS

| | | | |
|---|---|---|---|
| 6,700,526 B2 | 3/2004 | Witten | |
| 6,975,942 B2 | 12/2005 | Young et al. | |
| 2002/0140597 A1* | 10/2002 | Taylor | G01S 7/14 342/28 |
| 2010/0315280 A1 | 12/2010 | Bakhtar | |
| 2016/0363664 A1 | 12/2016 | Mindell et al. | |
| 2018/0011212 A1 | 1/2018 | Kang et al. | |

OTHER PUBLICATIONS

André, F, M. Jonard, and S. Lambot, 2015, Non-invasive forest litter characterization using full-wave inversion of microwave radar data: IEEE Transactions on Geoscience and Remote Sensing, 53, 828-840.

Booth, A., R. A. Clark, and T. Murray, 2011, Influences on the resolution of GPR velocity analyses and a Monte Carlo simulation for establishing velocity precision: Near Surface Geophysics, 9, 399-411.

Bumpus, P. B., and S. Kruse, 2014, Case history: Self-potential monitoring for hydrologic investigations in urban covered-karst terrain: Geophysics, 79, No. 6, B231-B242.

(Continued)

*Primary Examiner* — Timothy A Brainard
(74) *Attorney, Agent, or Firm* — Nicholas Pfeifer; Smith & Hopen, P.A.

(57) ABSTRACT

A new method for FWI of common-offset GPR data, particularly targeting the dimensions and infilling material of buried pipes. The method is useful in situation where clear isolated diffraction hyperbolas indicate the presence of a pipe, but pipe dimensions and filling may be unknown. The invention is a method of taking GPR data and applying advanced numerical methods to get the depth and size of an underground pipe in a very accurate manner. An embodiment of the method consists of five main steps: GPR data processing, ray-based analysis to set a good initial model, 3D to 2D transformation of data, effective SW estimation, and FWI.

20 Claims, 16 Drawing Sheets

(56) References Cited

OTHER PUBLICATIONS

Busch, S., J. van der Kruk, J. Bikowski, and H. Vereecken, 2012, Quantitative conductivity and permittivity estimation using full-waveform inversion of on-ground GPR data: Geophysics, 77, No. 6, H79-H91.

Busch, S., J. van der Kruk, and H. Vereecken, 2014, Improved characterization of tine-texture soils using on-ground GPR full-waveform inversion: IEEE Transactions on Geoscience and Remote Sensing, 52, 3947-3958.

Busch, S., L. Weihermüller, J. A. Huisman, C. M. Steelman, A. L. Endres, H. Vereecken, and J. Kruk, 2013, Coupled hydrogeophysical inversion of time-lapse surface GPR data to estimate hydraulic properties of a layered subsurface: Water Resources Research, 49, 8480-8494.

Cassidy, N. J., 2009, Ground penetrating radar data processing, modelling and analysis, in Harry, M. J., ed., Ground penetrating radar: theory and applications, Elsevier, 141-176.

Crocco, L., G. Prisco, F. Soldoveiri, and N. J. Cassidy, 2009, Early-stage leaking pipes GPR monitoring via microwave tomographic inversion: Journal of Applied Geophysics, 67, 270-277.

De Coster, A., A. P. Tran, and S. Lambot, 2016, Fundamental analyses on layered media reconstruction using GPR and full-wave inversion in near- field conditions: IEEE Transactions on Geoscience and Remote Sensing, 54, 5143-5158.

Demirci, S., E. Yigit, I. H. Eskidemir, and C. Ozdemir, 2012, Ground penetrating radar imaging of water leaks from puried pipes based on back projection method: NDT&E International, 47, 35-42.

Dou, Q., L. Wei, D. R. Magee, and A. G. Cohn, 2017, Real-time hyperbola recognition and fitting in GPR data: IEEE Transactions on Geoscience and Remote Sensing, 55, 51-62.

Ernst, J. R., A. G. Green, H. Maurer, and K. Holliger, 2007, Application of a new 2D time-domain full-waveform inversion scheme to crosshole radar data: Geophysics, 72, No. 5, J53-J64.

Fisher, S. C., R. R. Stewart, and H. M. Jol, 1992, Processing ground penetrating radar (GPR) data: CREWES Research Report 4, 11-2-11-22.

Forbriger, T., L. Groos, and M. Schafer, 2014, Line-source simulation for shallow-seismic data. Part 1: Theoretical background: Geophysical Journal International, 198, 1387-1404.

Giannopoulos, A., 2005, Modelling ground penetrating radar by GprMax: Construction and Building Materials, 19, 755-762.

Grandjean, G., J. C. Gourry, and A. Bitri, 2000, Evaluation of GPR techniques for civil-engineering applications: study on a test site: Journal of Applied Geophysics, 45, 141-156.

Gueting, N., A. Klotzsche, J. van der Kruk, J. Vanderborght, H. Vereecken, and A. Englert, 2015, Imaging and characterization of facies heterogeneity in an alluvial aquifer using GPR full-waveform inversion and cone penetration tests: Journal of Hydrology, 524, 680-695.

Gueting, N., T. Vienken, A. Klotzsche, J. van der Kruk, J. Vanderborght, J. Caers, H. Vereecken, and A. Englert, 2017, High resolution aquifer characterization using crosshole GPR full-waveform tomography: Comparison with direct-push and tracer test data: Water Resources Research, 53, 49-72.

Janning, R., A. Busche, T. Horvath, and L. Schmidt-Thieme, 2014, Buried pipe localization using an iterative geometric clustering on GPR data: Artificial Intelligence Review, 42, 403-425.

Jazayeri, S., and S. Kruse, 2016, Full-waveform inversion of ground-penetrating radar (GPR) data using pest (FWI-pest method) applied to utility detection: 86th Annual International Meeting, SEG, Expanded Abstracts, 2474-2478.

Kalogeropoulos, A., J. van der Kruk, J. Hugenschmidt, S. Busch, and K. Merz, 2011, Chlorides and moisture assessment in concrete by GPR full waveform inversion: Near Surface Geophysics, 9, 277-285.

Keskinen, J., A. Klotzsche, M. C. Looms, J. Moreau, J. van der Kruk, K. Holliger, L. Stemmerik, and L. Nielsen, 2017, Full-waveform inversion of crosshole GPR data: Implications for porosity estimation in chalk: Journal of Applied Geophysics, 140, 102-116.

Klotzsche, A., J. van der Kruk, J. Bradford, and H. Vereecken, 2014, Detection of spatially limited high-porosity layers using crosshole GPR signal analysis and full-waveform inversion: Water Resources Research, 50, 6966-6985.

Klotzsche, A., J. van der Kruk, N. Linde, J. A. Doetsch, and H. Vereecken, 2013, 3-D characterization of high-permeability zones in a gravel aquifer using 2-D crosshole GPR full-waveform inversion and waveguide detection: Geophysical Journal International, 195, 932-944.

Klotzsche, A., J. van der Kruk, G. A. Meles, J. A. Doetsch, H. Maurer, and N. Linde, 2010, Full-waveform inversion of crosshole ground penetrating radar data to characterize a gravel aquifer close to the Thur River, Switzerland: Near Surface Geophysics, 8, 631-646.

Klotzsche, A., J. van der Kruk, G. Meles, and H. Vereecken, 2012, Crosshole GPR full-waveform inversion of waveguides acting as preferential flow paths within aquifer systems: Geophysics, 77, No. 4, H57-H62.

Lambot, S., E. C. Slob, I. van den Bosch, B. Stockbroeckx, and M. Vanclooster, 2004, Modeling of ground-penetrating radar for accurate characterization of subsurface electric properties: IEEE Transactions on Geoscience and Remote Sensing, 42, 2555-2568.

Lavoué, F., R. Brossier, L. Métivier, S. Garambois, and J. Virieux, 2014, Two-dimensional permittivity and conductivity imaging by full waveform inversion of multioffset GPR data: A frequency-domain quasi-Newton approach: Geophysical Journal International, 197, 248-268.

Lester, J., and L. E. Bemold, 2007, Innovative process to characterize buried utilities using ground penetrating radar: Automation in Construction, 16, 546-555.

Liu, H., and M. Sato, 2014, In situ measurement of pavement thickness and dielectric permittivity by GPR using an antenna array: NDT&E International, 64, 65-71.

Liu, H., X. Xie, K. Takahashi, and M. Sato, 2014, Groundwater level monitoring for hydraulic characterization of an unconfined aquifer by common mid-point measurements using GPR: JEEG, 19, 259-268.

Loeffler, O., and M. Bano, 2004, Ground penetrating radar measurements in a controlled vadose zone: Influence of the water content: Vadose Zone Journal, 3, 1082-1092.

Mahmoudzadeh Ardakani, M. R., D. C. Jacques, and S. Lambot, 2016, A layered vegetation model for GPR full-wave inversion: IEEE Journal of Selected Topics in Applied Earth Observations and Remote Sensing, 9, 18-28.

Meles, G. A., S. A. Greenhalgh, J. Van der Kruk, A. G. Green, and H. Maurer, 2012, Taming the non-linearity problem in GPR full-waveform inversion for high contrast media: Journal of Applied Geophysics, 78, 31-43.

Meles, G. A., J. Van der Kruk, S. A. Greenhalgh, J. R. Ernst, H. Maurer, and A. G. Green, 2010, A new vector waveform inversion algorithm for simultaneous updating of conductivity and permittivity parameters from combination crosshole/borehole-to-surface GPR data: IEEE Transactions on Geosciences and Remote Sensing, 48, 3391-3407.

Murray, T., A. Booth, and D. M. Rippin, 2007, Water-content of glacier-ice: Limitations on estimates from velocity analysis of surface ground-penetrating radar surveys: JEEG, 12, 87-99.

Ni, S., Y. Huang, K. Lo, and D. Lin, 2010, Buried pipe detection by ground penetrating radar using the discrete wavelet transform: Computers and Geotechnics, 37, 440-448.

Radzevicius, S., 2015, Least-squares curve fitting for velocity and time zero: Presented at the 8th IWAGPR.

Ristic, A. V., D. Petrovacki, and M. Govedarica, 2009, A new method to simultaneously estimate the radius of a cylindrical object and the wave propagation velocity from GPR data: Computers & Geosciences, 35, 1620-1630.

Roberts, R. L., and J. J. Daniels, 1996, Analysis of GPR polarization phenomena: JEEG, 1, 139-157.

(56) References Cited

OTHER PUBLICATIONS

Sham, J. F. C., and W. W. L. Lai, 2016, Development of a new algorithm for accurate estimation of GPR's wave propagation velocity by common-off-set survey method: NDT&E International, 83, 104-113.

Tran, A. P., F. André, and S. Lambot, 2014, Validation of near-field ground-penetrating radar modeling using full-wave inversion for soil moisture estimation: IEEE Transactions on Geoscience and Remote Sensing, 52, 5483-5497.

Vacher, L., School of Geosciences, University of South Florida, 2017, USF GeoPark, history of the GeoPark, http://hennarot.forest.usf.edu/main/depts/geosci/facilities/geopark.aspx, accessed Aug. 1, 2017.

Van der Kruk, J., N. Gueting, A. Klotzsche, G. He, S. Rudolph, C. von He-bel, X. Yang, L. Weihermaller, A. Mester, and H. Vereecken, 2015, Quantitative multi-layer electromagnetic induction inversion and full-waveform inversion of crosshole ground penetrating radar data: Journal of Earth Science, 26, 844-850.

Villela, A., and J. M. Romo, 2013, Invariant properties and rotation trans- formations of the GPR scattering matrix: Journal of Applied Geophysics, 90, 71-81.

Virieux, J., and S. Operto, 2009, An overview of full-waveform inversion in exploration geophysics: Geophysics, 74, No. 6, WCC1-WCC26.

Warren, C., A. Giannopoulos, and I. Giannakis, 2016, gprMax: Open source software to simulate electromagnetic wave propagation for Ground Penetrating Radar: Computer Physics Communications, 209, 163-170.

Wiwatrojanagul, P., R. Sahamitmongkol, S. Tangtermsirikul, and N. Khamsemanan, 2017, A new method to determine locations of rebars and estimate cover thickness of RC structures using GPR data: Construction and Building Materials, 140, 257-273.

Yang, X., A. Klotzsche, G. Meles, H. Vereecken, and J. van der Kruk, 2013, Improvements in crosshole GPR full-waveform inversion and application on data measured at the Boise Hydrogeophysics Research Site: Journal of Applied Geophysics, 99, 114-124.

Zeng, X., and G. McMechan, 1997, GPR characterization of buried tanks and pipes: Geophysics, 62, 797-806.

\* cited by examiner

PRECISE INFRASTRUCTURE MAPPING USING FULL-WAVEFORM INVERSION OF GROUND PENETRATING RADAR SIGNALS

BACKGROUND OF THE INVENTION

1. Field of the Invention

This invention relates, generally, to ground penetrating radar. More specifically, it relates to the use of full-waveform inversion to better estimate the characteristics of underground objects and media.

2. Brief Description of the Prior Art

Modern life depends on subsurface pipelines used to carry water, oil, gas, sewage, and other fluids. Civil engineering and construction industries face the challenge of maintaining and repairing existing pipelines as well as laying new pipes. Increasing demand for new buried utilities increases the risk of damaging existing utilities (Lester and Bernold, 2007). As infrastructure ages, the demand for repairs and replacement requires knowledge of the locations and connectivity of multiple utility systems installed at different times, using different materials, in increasingly dense networks, in which records are often incomplete. In such scenarios, simply detecting a pipe at a given location may not be sufficient information. Ground-penetrating radar (GPR) resolution of not only the presence of the pipe, but also the pipe diameter, pipe material, or pipe-filling material (e.g., air, water, etc.) could be a way to distinguish and map different generations or types of utilities.

GPR has become one of the primary tools of choice for mapping the locations of pipes in urban settings. The transmitting antenna emits an electromagnetic (EM) pulse that propagates into the sub-surface. The EM pulse travels through the subsurface material, and it is reflected, scattered, and attenuated. The reflection or scattering occurs when the pulse encounters a subsurface inhomogeneity, in particular, soil heterogeneities or targets with contrasting dielectric properties (permittivity). Permittivity here is expressed as relative permittivity, which is the ratio of the material permittivity to the permittivity of free space. The pulse attenuation is primarily controlled by the electrical conductivity of the soil. Reflected energy is recorded by the receiving antenna. The signal recorded at the receiving antenna contains a combination of the energy traveling in air and along the ground surface, reflected and refracted energy from soil inhomogeneities, buried targets (in this case, pipes), and noise. A buried pipe generates a characteristic diffraction hyperbola because of its shape and contrast in EM properties with the background soil. The diffraction hyperbolas of pipes in GPR profiles are sufficiently distinctive such that they can be displayed and interpreted in real time; hence, GPR is widely used for on-the-spot utility detection.

The horizontal position of an underground pipe on a GPR profile is readily established as the location of the peak of the characteristic diffraction hyperbola (See FIG. 1). Inferring the depth to the top of the pipe requires knowledge of the average velocity structure of materials over the pipe. One way to derive the propagation velocity in the medium is by conducting a common-midpoint (CMP) or wide-angle reflection and refraction (WARR) survey, in which the spacing between the transmitter and receiver is progressively increased.

Following methods derived for stacking seismic data, layer velocities can be determined by semblance analysis (Fisher et al., 1992; Grandjean et al., 2000; Liu and Sato, 2014; Liu et al., 2014). This method has the advantage of recovering information on how velocity varies with depth, but it requires surveys with systems that permit a variable offset between transmitter and receiver. Alternatively, an average velocity can be determined from the shape and timing of the diffraction hyperbola that forms the GPR return from the pipe itself. So, in general, the pipe depth is estimated by finding the average velocity that best fits the measured hyperbola. However, Sham and Lai (2016) observe that the curve-fitting method is biased by human judgment.

The present invention focuses on how to extract additional information about pipes, beyond position and depth, from GPR profiles. The pipe diameter affects GPR returns, most visibly when the radar wavelength is small compared with the pipe diameter and the pipe's permittivity is significantly different from the surrounding soil (Roberts and Daniels, 1996). In this case, distinct returns can be captured from the top and bottom of the pipe, as shown in FIG. 1 (e.g., Zeng and McMechan, 1997). When the pipe is narrow enough that the top and bottom returns overlap and interfere, extracting information on pipe diameter from the single hyperbola is challenging. For example, Wiwatrojanagul et al. (2017) report no significant difference for the hyperbolic reflections for different rebar diameters. Diameter estimation based on fitting hyperbolas is clearly impacted by decisions about the phase of the pipe return selected for the fit (because one can choose either positive or negative phases; see Dou et al., 2017) and trade-offs made in wave velocity and pipe diameter selections. The hyperbola-fitting method also fails to provide any information about the pipe-filling material.

Ristic et al. (2009) present a method to estimate the radius of a cylindrical object and the wave propagation velocity from GPR data simultaneously based on the hyperbola fitting. In their method, the target radius is estimated by extracting the location of the apex of the hyperbola and the soil velocity that best fits the data for a point reflector, followed by finding an optimal soil velocity and target radius, using a nonlinear least-squares fitting procedure. This method is handicapped because the variability in the GPR source wavelet (SW) and local complexities in the soil's permittivity and conductivity structure affect the shape of the returned pulse. This in turn affects how the arrival times of diffracted returns are defined. These perturbations to the arrival time can be on the order of the changes expected with the changing cylinder diameter, making it difficult to distinguish the pipe diameter from the wavelet from the permittivity and conductivity complexities.

Other researchers have also investigated the complexities associated with pipe returns. For example, GPR can be applied for leakage detection from the pipes. Crocco et al. (2009) and Demirci et al. (2012) successfully detect water leakage from plastic pipes using GPR by applying microwave tomographic inversion and a back-projection algorithm, respectively. Ni et al. (2010) use a discrete wavelet transform (DWT) to filter and enhance GPR raw data to improve image quality. They find DWT to be advantageous in the detection of deeper pipes if shallower anomalies obscure the reflected signal from deeper targets, but they do not extract pipe diameter information. Janning et al. (2014) present an approach for hyperbola recognition and pipe localization in radargrams, which use an iterative-directed shape-based clustering algorithm to recognize hyperbolas and identify groups of hyperbola reflections that belong to a single buried pipe.

An alternative approach, upon which this invention relies, is full-waveform inversion (FWI) for selected properties of the subsurface. FWI uses information from the entire waveform. Virieux and Operto (2009) provide an overview of the development of using FWI for seismic data, but seismic wavelengths are typically too long to be useful for imaging subsurface utilities. FWI on GPR data is most commonly applied on crosshole GPR data to study aquifer material (e.g., Ernst et al., 2007; Klotzsche et al., 2010, 2012, 2013, 2014; Meles et al., 2010, 2012; Yang et al., 2013; Gueting et al., 2015, 2017; van der Kruk et al., 2015; Keskinen et al., 2017) or on frequency-domain air-launched GPR signals for a limited number of model parameters (Lambot et al., 2004; Tran et al., 2014; Andréet al., 2015; De Coster et al., 2016; Mahmoudzadeh Ardakani et al., 2016). Lavoué et al. (2014) use frequency domain FWI to image 2D subsurface electrical structures on multi-offset GPR data. Kalogeropoulos et al. (2011) use FWI on surface GPR data to monitor chloride and moisture content in media. Busch et al. (2012, 2014) apply FWI on surface GPR data to characterize soil structure and to obtain conductivity and permittivity estimations. Busch et al. (2013) further apply FWI on surface GPR data to estimate hydraulic properties of a layered subsurface.

While some of the studies above consider the combination of GPR data and FWI, none have applied ground surface GPR data for underground utilities or rebar in combination with FWI to provide improved resolution of utility/rebar dimensions and properties, compared to traditional GPR data analysis. Ground surface GPR surveys and the corresponding full waveform data from buried pipes/rebar can be inverted to achieve more accurate estimations of the depth, size, and infilling material of underground pipes/rebar than can be achieved with other methods described. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a system and method for better estimating accurate geometry and infilling material of subsurface objects is now met by a new, useful, and nonobvious invention.

The present invention builds on previous works by applying the FWI method to the problem of pipe/rebar diameter and infilling material/rebar properties estimation. Multiple variables that influence the GPR diffraction hyperbola can be incorporated into the inversion process of the present invention. Here, the method is assessed when the source wavelet, average soil permittivity, pipe/rebar depth and horizontal position, pipe inner diameter or rebar outer diameter, and pipe-filling material or rebar material are optimized in the inversion.

The novel method for determining physical properties of a subsurface object (e.g. an underground pipe or reinforcing bar) disposed in a surrounding media (e.g. soil or concrete) includes first acquiring measured ground penetrating (GPR) data from a GPR device having at least one antenna in a broadside orientation with respect to the subsurface object. The GPR device discharges and receives electromagnetic waves. The measured GPR data includes at least one measured diffraction hyperbola. In an embodiment, a high frequency noise filter, a dewow filter, and time-zero corrections are applied to the measured GPR data.

Upon receiving the GPR data, parameters are estimated to produce an initial model of the subsurface object and the surrounding media. The parameters are adjusted until the initial model produces a simulated diffraction hyperbola that is offset less than one-half a wavelength from the measured diffraction hyperbola. The parameters include a velocity of electromagnetic waves through media in which the subsurface object is located, a depth of the subsurface object in the surrounding media, a horizontal location of the subsurface object, a size of the subsurface object, an average conductivity of the surrounding media, an average permittivity of the surrounding media, and a permittivity of any material or fluid within the subsurface object.

In an embodiment, a least squares method is employed to estimate the initial depth of the subsurface object in the media and the initial velocity of the electromagnetic waves through media in which the subsurface object is located, based on arrival times estimated for the diffraction hyperbola.

In an embodiment, the size of the subsurface object is estimated using a root mean square average of travel time differences between the peak amplitudes of the two distinct hyperbolas when two distinct hyperbolas from a top and a bottom of the subsurface object are measured in the GPR data.

Once the parameters of the initial model are estimated, the measured source wavelet is acquired and the system deconvolves the initial model from the measured GPR to produce a corrected source wavelet. The initial model is then simulated with the corrected source wavelet to produce simulated GPR signals. In an embodiment, more than one iteration of deconvolving the initial model from the measured ground penetrating data is performed to produce the corrected source wavelet.

Finally, a cost function is determined and at least one of the plurality of parameters are adjusted to minimize the cost function. In an embodiment, the conductivity of the surrounding media is fixed during the step of adjusting at least one of the plurality of parameters to minimize the cost function. The step of adjusting the plurality of parameters to minimize the cost function may be performed a predetermined number of times. Moreover, an embodiment may include establishing boundary values for one or more of the plurality of parameters between which the parameters are adjusted in the step of adjusting the plurality of parameters to minimize the cost function.

An embodiment of the present invention may be adjusted to determine the characteristics of any underground objects. For example, the system may be configured to determine the characteristics of solid objects disposed underground or even the characteristics of sections of the subsurface media. In such an embodiment the parameters of the initial model are adjusted. Unnecessary parameters may be removed all together or a constant may be inputted for the value of the unnecessary parameters. Then during the minimization of the cost function, i.e. reduction of the misfit between the measured data and the modelled data, the unnecessary parameters remain constant and are not optimized.

An object of the invention is to provide a system and method adapted to more accurately estimate an underground object's size (e.g. diameter) and infilling material than is possible using only arrival times of the diffraction hyperbola in the GPR data.

A further object of this invention is to provide a method of gathering more accurate characteristic data for any underground objects using any type of GPR data.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
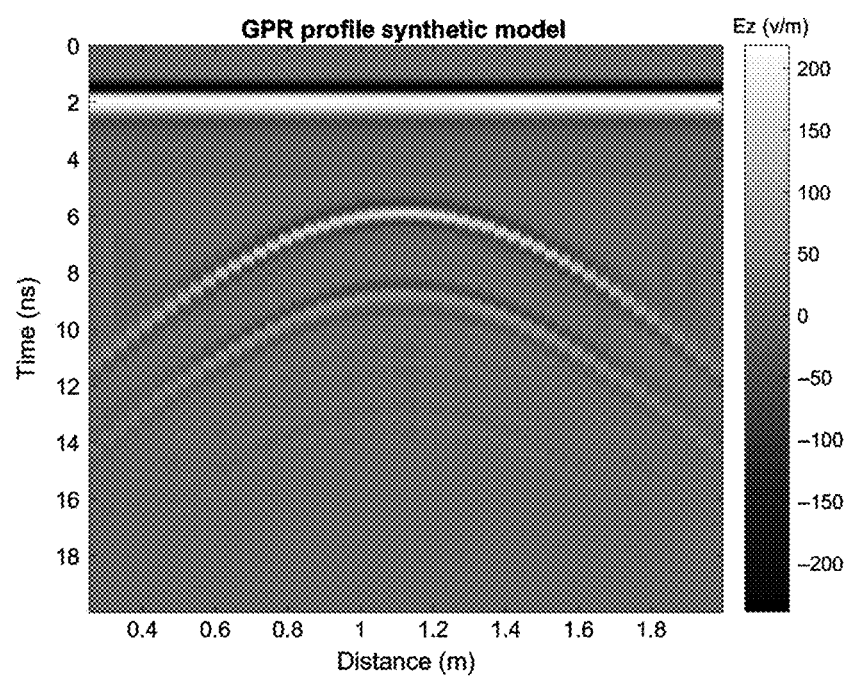
FIG. 1 is a synthetic GPR profile for an air-filled PVC pipe. The inner diameter of the pipe is 40 cm with a wall thickness of 3 mm; the central frequency of the antenna is 800 MHz. In this case, distinct reflections from the top and bottom of pipe are observed; later, weaker arrivals are multiples.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes a system and method of using a full-waveform inversion (FWI) for improving estimates of the diameter of an object, e.g. a pipe, and estimating or confirming, when applicable, the infilling material (air/water/etc.). The disclosure focuses on the simple case of an isolated diffraction hyperbola on a profile run perpendicular to a pipe with antennas in broadside mode (parallel to the pipe). The technique described improves a good initial guess of the pipe diameter (within 30%-50% of the true value when using GPR diffraction hyperbola arrival times) to a better estimate (less than approximately 8% misfit). This method is developed by combining two freely available software packages with a deconvolution method for GPR effective source wavelet estimation. The FWI process is then run with the PEST algorithm (model-independent parameter estimation and uncertainty analysis). PEST iteratively calls the gprMax software package for forward modeling of the GPR signal as the model for the pipe and surrounding soil is refined.

An embodiment of the present invention generally includes five main steps: (1) basic processing of the raw GPR data, (2) defining the starting model using the ray-based diffraction hyperbola analysis, (3) transformation of 3D data to 2D, (4) finding a good effective source wavelet (SW), and (5) an iterative inversion process that runs to a threshold criterion to find a parameter that best fits the data.

It should also be noted that the goals of the experimentation described herein were to improve the initial estimates of pipe diameter and pipe-filling material and soil permittivity. Estimating the conductivity of the pipe-filling material (or soil) would require further computational expense, in the form of updating the SW estimation (step 4) at each iteration of the inversion process in step 5. Here, the conductivity values are estimated from ray theory and then fixed during the inversion process. To eliminate errors caused by inaccurate conductivity values, traces are individually normalized before misfit calculations in the inversion process. The pipe wall thickness estimate is also fixed in the inversion process, as typical values of a few mm put it below the GPR signal resolution.

Figure 2:
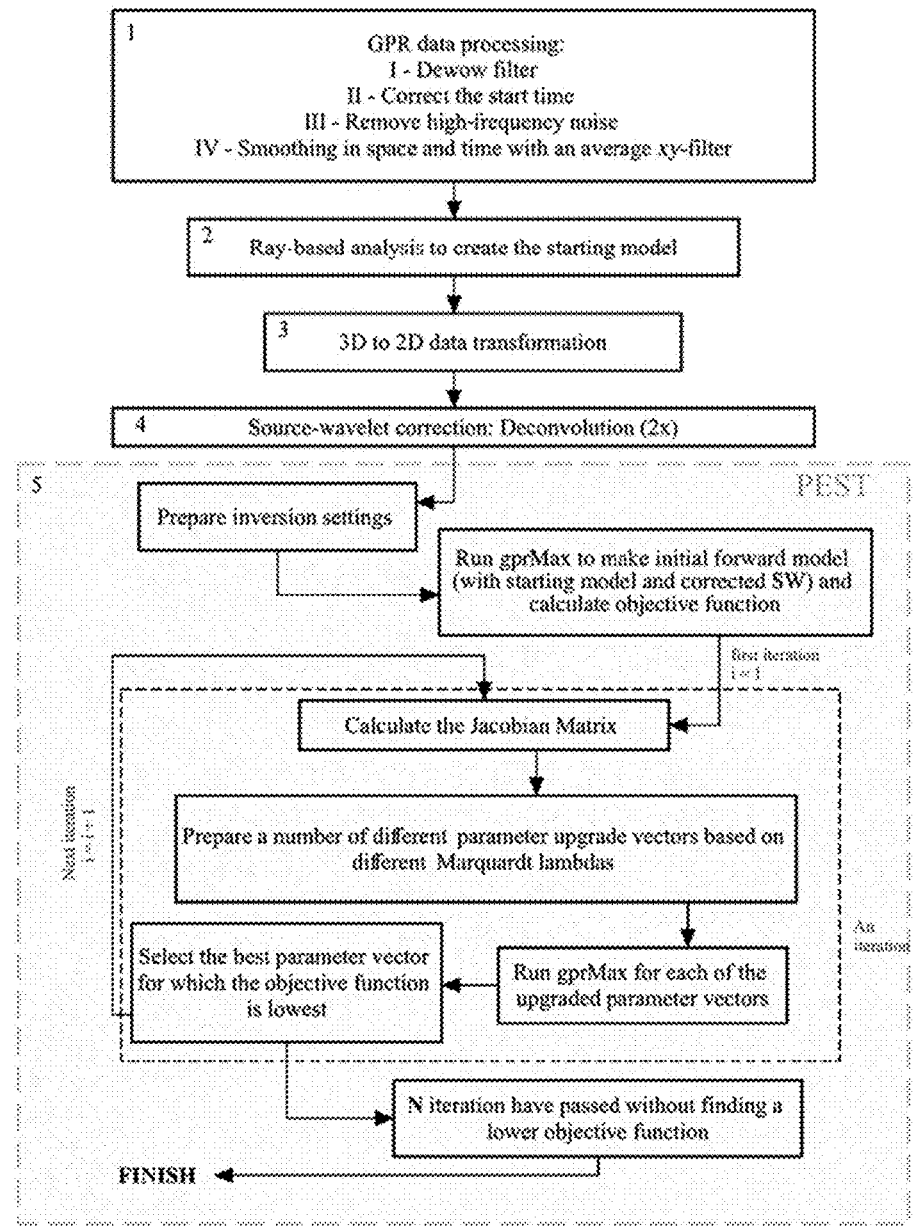
FIG. 2 is a flowchart of an embodiment of the present invention.

Referring now to FIG. 2, which depicts an embodiment of the present invention, the method includes five steps for determining the characteristics of underground objects, such as a best-fitting pipe diameter and other parameters. For ease of explanation, the discussion hereinafter will be treated as if the underground object is a pipe. As shown in the exemplary flowchart, the first step (1) is acquiring and performing basic processing of raw GPR data. The basic processing may include a standard dewow filter and time-zero corrections (e.g., Cassidy, 2009) followed by a high-cut frequency filter (2 GHz was used in the experimental section discussed below). High-frequency noise removal is important because the forward models generated during the inversion process (described below, FIG. 3) simulate "clean" data without such noise. In practice, additional data smoothing in the x and y (space and time) dimensions is found to help the inversion efficiency. The optimal window size for the xy filter appears to vary with individual data sets, and selection depends on the interpreter's experience. The combined effects of these processing steps on the signal amplitude, for all data presented here, are on average less than 1% through the traces. On the two noisiest traces, the average amplitude change is 4%. The data are not gained.

The next step of the novel method as depicted in the exemplary flow chart of FIG. 2 is defining the starting model using ray-based diffraction hyperbola analysis (2). The FWI and the effective SW estimation are impossible without a good initial model. The ray-based analysis (also referred to as "arrival time analysis") is used to estimate the initial model parameters. The starting model created in step 2 includes initial estimates of the average soil velocity and therefore electrical permittivity, soil electrical conductivity, object's lateral location, and depth. In this workflow, the user assumes a permittivity of the object-filling material (e.g., a value expected for air, water, or sewage) and the object material (e.g., PVC) and object wall thickness. With these assumptions, a value for the electrical conductivity within the object and a starting estimate of the object's diameter are also derived.

First, travel times of the peak amplitudes of the diffraction hyperbola (from the top of pipe, if two are observed) are identified. Second, a least-squares method, such as the one disclosed in Radzevicius (2015), is used to estimate the average soil velocity, pipe depth, and lateral position that best fits the peak amplitude times, assuming the pipe to be a point diffractor and zero offset between antennas.

If two distinct hyperbolas from the pipe top and pipe bottom are recognized, then the diameter is estimated from the root mean square (rms) average of the travel time differences ($\Delta t$) for the peak amplitudes of returns from the pipe top and pipe bottom on traces in the diffraction hyperbola, where diameter $=(v_{filling}/2)\Delta t_{rms}$ and $v_{filling}$ is the velocity assumed for the pipe-filling material. The interpreter can assume the pipe to be water or air filled to estimate $v_{filling}$.

If the resulting diameter appears unreasonable, an alternative filling medium can be considered (for most engineering utility scenarios, if distinct reflections from the top and bottom of the pipe are recorded with 800 MHz antennas, it is likely that the pipes are water filled). For instance, a 10 cm diameter water filled pipe generates almost the same time interval between the hyperbolas off the pipe top and pipe bottom as a 90 cm diameter air-filled pipe. If no hyperbola from the pipe bottom can be recognized, interpreters must rely on their best guesses for the initial diameter based on knowledge of the site.

Next, an average soil conductivity is estimated by a least-squares approach. Assuming homogeneous soil, the amplitude of the GPR wave decays due to geometric spreading and soil attenuation. The combination of these two effects can be described with wave amplitude proportional to $e^{-\alpha r}/r$ in 3D media, in which the attenuation term $\alpha$ can be described as $$\alpha = \frac{\sigma}{2}\sqrt{\frac{\mu}{\varepsilon}} \qquad (A-1)$$

where $\sigma$ is the soil conductivity, $\mu$ is the magnetic permeability, and $\varepsilon$ is the mean absolute electrical permittivity of the soil.

To estimate the conductivity of the soil, the peak amplitudes of the first pipe diffraction hyperbola arrivals are picked and used in a least-squares inversion for the attenuation term, and thereby the soil conductivity. Assuming far-field amplitudes, a uniform antenna radiation pattern, and a uniform reflection coefficient from all parts of the pipe, the amplitude A of the wave having traveled a distance r is expressed as $$A = A_0 \frac{e^{-\alpha r}}{r} \qquad (A-2)$$

where $A_0$ is a constant. The term $e^{-\alpha r}$ can be replaced by the first two terms of its Taylor series expansion, $1+\alpha r$, leaving $A=A_0(1/(e^{\alpha r})r) \approx A_0(1+\alpha r)r$. Rearranging, $$\left(\frac{1}{A_0}\right)Ar + \left(\frac{\alpha}{A_0}\right)Ar^2 = 1 \qquad (A-3)$$

By picking the peak amplitude and computing the travel distance for each trace in the diffraction hyperbola, the Jacobian matrix J is created. Then, the unity vector I and parameter vector p are calculated via $$J = \begin{bmatrix} A_1 r_1 & A_1 r_1^2 \\ \vdots & \vdots \\ A_n r_n & A_n r_n^2 \end{bmatrix}; p = \begin{bmatrix} p_1 \\ p_2 \end{bmatrix}; I = \begin{bmatrix} 1 \\ \vdots \\ 1 \end{bmatrix} \qquad (A-4)$$

The parameter vector p can be estimated with the least-squares solution ($p=(J^T J)^{-1} J^T I$) of these systems using equation A-4. The attenuation term $\alpha$ is estimated as $$\alpha = p_2/p_1 \qquad (A-5)$$

While the simplifying assumptions about far-field amplitudes, radiation patterns, and uniform scattering are not strictly valid in real scenarios, tests showed that more complicated models did not yield conductivity estimates that consistently produced better inversion results.

The maximum absolute amplitudes on the recorded hyperbola from the top of the pipe are used to find the best conductivity model that fits the data. With isolated, clear diffraction hyperbolas and some knowledge about the expected target properties, it is possible to make sufficiently good starting models such that the inversion can proceed successfully. Meles et al. (2012) indicate that successful inversion requires initial models return synthetic data pulses that are offset less than one-half wavelength from the measured traces. Ray-based analysis enables this criterion to be satisfied.

Referring back to FIG. 2, the third step (3) in the novel method is transforming the data from 3D to 2D. To simulate 2D line-source generated waveforms that would be equivalent to those observed in the 3D data, a transformation is applied to the data. This transformation is a prerequisite for the application of the 2D forward modeling in the inversion process, as noted for example by Ernst et al. (2007), Klotzsche et al. (2010, 2013), and Meles et al. (2012). An embodiment follows the method developed by Forbriger et al. (2014) to transform 3D shallow seismic data to 2D. Their method convolves data in the time domain with a $\sqrt{t^{-1}}$, where t is the traveltime, followed by an amplitude correction. The convolution provides a $\pi/4$ phase shift and corrects the geometric spreading difference between two and three dimensions.

It should be noted that the inversion procedure in step 5 requires forward modeling of GPR wave propagation. Because forward modeling of 3D waves is computationally expensive, 2D forward modeling was used during the experimentation described herein and is preferred. This requires a 3D to 2D transformation on the data, accounting for the expected differences between the real source and a line source, and correcting the geometric spreading factor. While the exemplary embodiment includes the 3D-2D transformation step, it should be understood that embodiments of the present invention may rely on forward modeling of 3D waves and thus forego the step of transforming the data from 3D to 2D.

Moving on to the fourth step (4) in the novel method depicted in FIG. 2, the effective SW is estimated once the data are transformed to two dimensions. The shape and the amplitude of the SW depend on the instrument used, ground coupling, and the surficial soil permittivity and conductivity structure. As such, the user has little control over the wavelet form while collecting data. However, a good effective SW estimation is critical for the success of the inversion (inversion runs without the wavelet estimation step yield markedly poorer results or fail to converge). An improved SW can be obtained by deconvolving radar data with the impulse response of the earth in the area of investigation (Ernst et al., 2007; Klotzsche et al., 2010; Kalogeropoulos et al., 2011). This deconvolution approach was adapted for the use of common-offset data. After acquiring a measured SW, the deconvolution is applied with the ray-based model and the observed data to produce a first corrected SW. In an embodiment, the process is repeated a second time to yield a second corrected SW. Details of a certain deconvolution procedure are described in Klotzsche et al. (2010). The deconvolution step is not restricted only to the procedure disclosed in Klotzsche. Rather, any deconvolution method may be used.

The method requires an initial guess of the waveform. For the instrument and terrain conditions in the case studies presented here (a Mala Geosciences ProEx 800 MHz shielded antenna on partially saturated clean sands), it was determined that the fourth derivative of a Gaussian wavelet (second derivative of a Ricker wavelet) is effective. The efficiency of the FWI method is found to be highly dependent on the availability of an accurately corrected SW. The recovered SW is in turn dependent on the starting model (impulse response) of soil and pipe properties, and on the number of data traces and time window within traces used in the wavelet correction. Errors in the starting model propagate into the effective SW, and errors in the amplitude of the SW in particular can trade-off with errors in the conductivity model. Because the conductivity estimations in the FWI approach are highly dependent on the SW, a successful FWI analysis that aims to estimate the conductivity values requires the SW to be updated at each iteration of the FWI process. Busch et al. (2012, 2014) extend the deconvolution approach for surface WARR GPR data and combine it with a frequency-domain FWI for a horizontally layered media that better describes the sensitivity of the SW estimation to subsurface parameters. Thereby, Busch et al. (2012, 2014) combine the FWI and an effective SW update in terms of medium parameters and wavelet phase and amplitude. In contrast to common-offset data, WARR data provide more information about amplitude decay with changing offset and allow a better conductivity estimation.

Adapting this approach to common-offset data is beyond the scope of this paper, and thus errors associated with the SW amplitude estimation and the conductivities in the inversion process are expected. This limitation is accounted for in the method by eliminating soil conductivity as an inversion parameter (it remains fixed at the initial value) and reducing the impact of the soil conductivity on the inversion process by normalizing traces individually when calculating the cost (objective) functions at each inversion step.

The fifth step (5) of the present invention as depicted in FIG. 2 is the FWI of the GPR returns from the pipe. The GPR returns are inverted to improve on the initial model of soil and pipe. In an embodiment, the inversion procedure is accomplished using two freely available software packages. The first, the PEST (model-independent parameter estimation and uncertainty analysis) package (Doherty, 2017), is used for inverting the data to find the best model parameters. PEST is a package developed for groundwater and surface-water studies, but it can be linked to any forward-modeling problem. PEST uses the Gauss-Marquardt-Levenberg non-linear estimation method (Doherty, 2010, 2015).

The second, gprMax 2D (Giannopoulos, 2005; Warren et al., 2016), is used to compute the GPR readings expected at each step as the model parameters are updated (Jazayeri and Kruse, 2016). Because small cell sizes are necessary for the inversion to accurately recover the pipe dimensions a 2D forward model is preferable.

The relationship between the model parameters (e.g., pipe radius and soil permittivity) and the model-generated observation data (GPR returns) is represented by the model function M that maps the n-dimensional parameter space into m-dimensional space, where m is the number of observational data points d. The term M should be differentiable with respect to all model parameters (Doherty, 2010). A set of parameters, p0 thus generate the model observations d0 (equation 1). Although generating another set of data d from a p vector slightly different from p0, the Taylor expansion provides equation 2 as an approximation, where J is the Ms Jacobian matrix:

$$d_0 = M p_0 \quad (1)$$

$$d = d_0 + J(p - p_0) \quad (2)$$

The best fitting model is the one that produces the minimum of the cost function $\varphi$ (equation 3), where d is the real data collected and Q is an m x m diagonal weights matrix:

$$\varphi = (d - d_0 - J(p - p_0))^T Q (d - d_0 - J(p - p_0)) \quad (3)$$

If u is denoted as the parameter upgrade vector, $u = p - p_0$, it can be written as $$u = (J^T Q J)^{-1} J^T Q R \quad (4)$$

where R is the nonnormalized vector of residuals for the parameter set, $R = d - d_0$.

This approach needs to be given a set of starting model parameters ($p_0$), which will be updated to find the global minimum of the cost function ($\varphi$) in the time domain. The optimization process can benefit from adjusting equation 4 by adding a Marquardt parameter ($\alpha$). The new form of the upgrade vector can be rewritten as equation 5, where I is the n'n identity matrix:

$$u = (J^T Q J + \alpha I)^{-1} J^T Q R \quad (5)$$

For problems with parameters with greatly different magnitudes, terms in the Jacobian matrix can be vastly different in magnitude. The round-off errors associated with this issue can be eliminated through the use of an nxn diagonal scaling matrix S. The ith element of the scaling matrix is defined as $$S_{ii} = (J^T Q J)_{ii}^{-1/2} \quad (6)$$

Finally, equation 6 can be rewritten as $$S^{-1} u = ((JS)^T Q J S + \alpha S^T S)^{-1} (JS)^T Q R \quad (7)$$

The largest element of $\alpha S^T S$ is often denoted as the Marquardt Lambda ($\lambda$), and it can be specified to help control the parameter upgrade vector u and optimize the upgrade process.

To start the inversion, PEST makes an initial call to gprMax to compute the initial GPR data set expected from the starting model $p_0$ with the corrected SW (FIG. 2, step 5). The Marquardt $\lambda$ value is set to 20, and PEST computes the initial cost function $\varphi$. Then, a lower $\lambda$ value is set and the cost function is recalculated. This process is repeated until a minimum cost function is found. If a lower cost function is not observed by $\lambda$ reduction, a higher lambda is tested. Parameters p are then updated using the $\lambda$ value that yields the minimum cost function, and the next iterations starts, with gprMax called again from PEST to compute the new corresponding GPR readings $d_0$. PEST then computes the residuals R between the updated model and real data. The next iteration starts with the best Marquardt $\lambda$ from the previous iteration. If, during the next iteration, a lower cost function is not achieved, a new vector of updated parameters will nevertheless be tested. This process continues until the step at which a lower cost function is not found after N iterations. The N in the disclosed experimental process was set to six. The user can also specify upper and lower bounds for the parameters p. In this study, the relative permittivity is restricted between 1 and 90, and pipe diameters are bounded between 0 and 20 cm.

A concern in any inversion process is that the algorithm leads to a local minimum rather than the global minimum solution. For the real data, the global minimum is not unambiguously identifiable. To avoid local minima trapping, to the extent possible, the recommendation described above that the initial synthetic data set is offset less than a half wavelength from the measured data is followed (e.g., Meles et al., 2012; Klotzsche et al., 2014). Then, to qualitatively assess the likelihood that the results presented represent a local minimum, the inversion process is conducted with multiple sets of initial model parameters $p_0$, and the cost function $\varphi$ at the conclusion of each run is computed. The selection of initial models is described below. Runs that terminate with variable best-fit parameters p and differing cost functions $\varphi$ are suggestive of termination at local minima.

Experimental Testing of the Invention

Figure 3A:
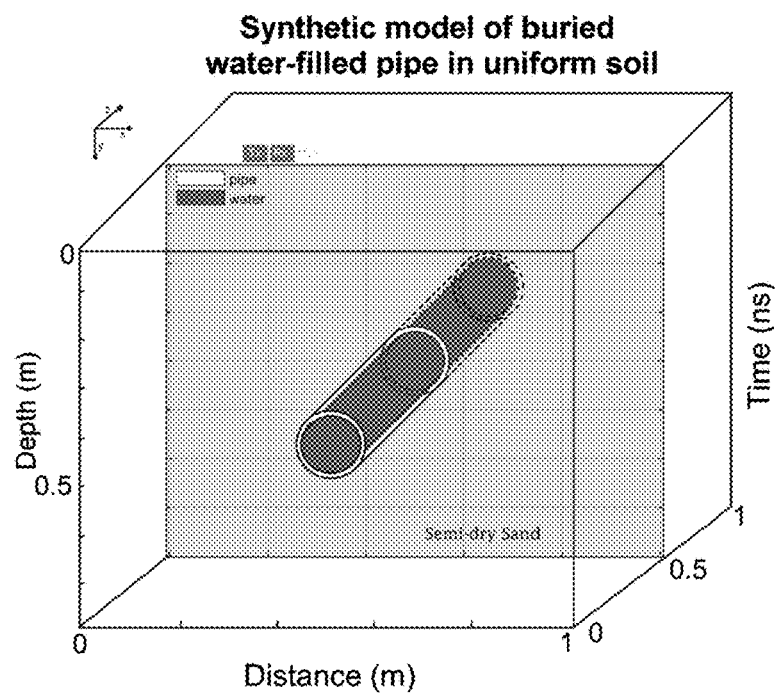
FIG. 3A is a model geometry for a PVC pipe containing fresh water embedded in semi-dry sand. The pipe inner and outer diameters are 10 and 10.6 cm, respectively. The colored cross sections show the part of the model over which the antenna has moved.
Figure 3B:
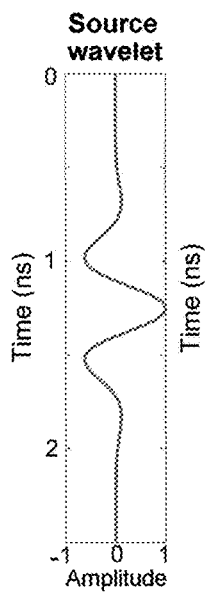
FIG. 3B is an 800 MHz fourth derivative Gaussian wavelet assumed for the GPR signal for the pipe in FIG. 3A.
Figure 3C:
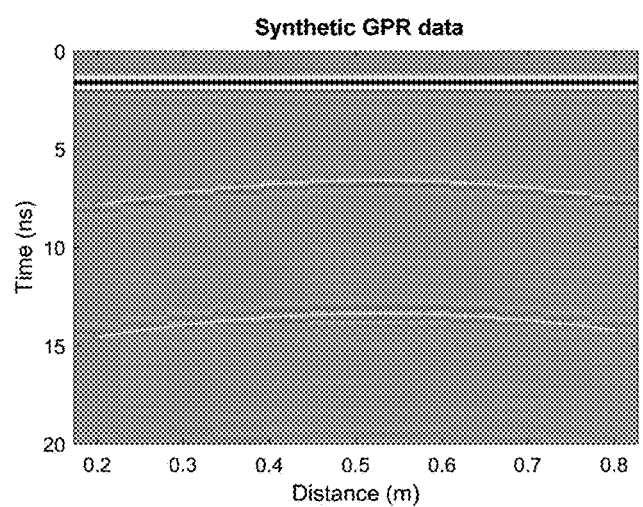
FIG. 3C is the GPR profile produced by synthesizing readings every 5 cm across the model. The circles show the arrival-time picks used in the ray-based inversion. The white lines show the arrival-time curves predicted form the ray-based inversion parameters.

This inversion method was evaluated by creating a 3D synthetic model of a PVC pipe filled with fresh water and buried 35 cm in homogeneous semi-dry sand (FIG. 3a; Table 1). The model was used to generate synthetic 3D GPR readings. The GPR data set (FIG. 3c) was created assuming a common-offset survey with an 800 MHz antenna set with 14 cm spacing between transmitter and receiver. Every 5 cm, a pulse was transmitted and received, with 12 traces in total. The synthetic waveform is a fourth derivative of the Gaussian waveform, similar to those of some commercial systems (FIG. 3b). The cell size in the gprMax 3D forward model was 1×1×1 mm.

Figure 4:
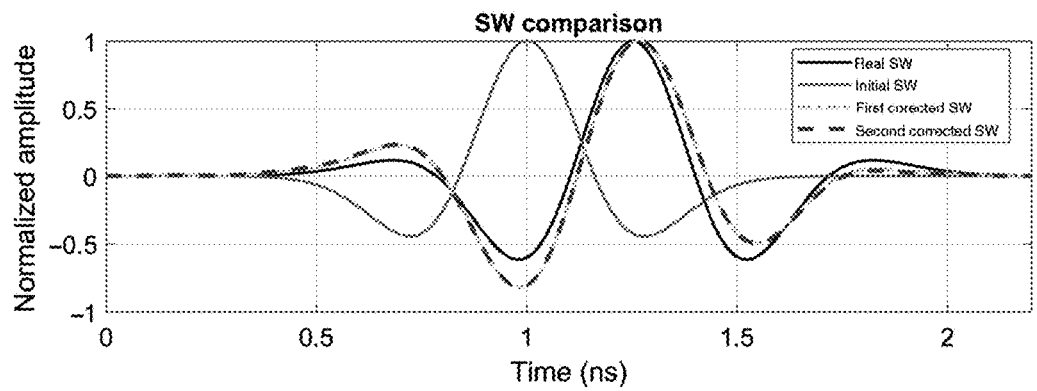
FIG. 4 is the real SW used to create 3D model (black), initial SW used in the synthetic model (gray); the first (light dashed gray), and second corrected effective SW pulse (dark dashed gray). The amplitudes are normalized.

A uniform soil permittivity, a uniform effective soil conductivity, a uniform effective in-filling conductivity, and the pipe lateral position and depth were set following the methods described above. Therefore, the unknown parameters in the inversion process were defined to be uniform soil and pipe-filling permittivity, pipe depth, and inner diameter. In this scenario, the pipe was assumed to be constructed with PVC of typical wall thickness (3 mm), and the pipe permittivity and conductivity are set to values appropriate for PVC (see Table 1). To mimic the inversion process in which the SW is not known, an initial guess of a Ricker wavelet was applied as the SW (FIG. 4) and a synthetic 2D model was generated using the ray-based estimated model and the Ricker wavelet. For the wavelet estimation, the direct air and ground wave were excluded. With the deconvolution method, the model SW was corrected (see FIG. 4, the first corrected SW). The synthetic data were again calculated with the first corrected wavelet. At the last step of the SW correction, the wavelet was deconvolved again using the second synthetic data and the observed data. In this process, the symmetric Ricker shape wavelet was altered to a non-symmetric form closer to the real wavelet.

Figure 5:
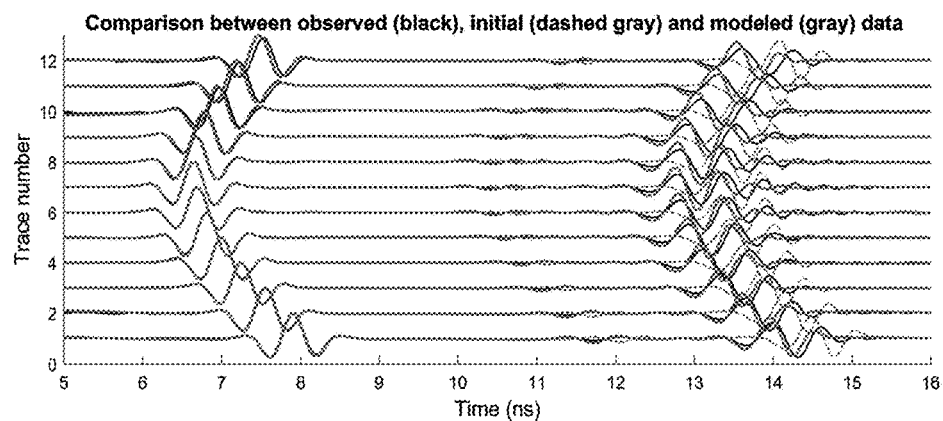
FIG. 5 is a comparison of observed true synthetic GPR traces (black), the GPR traces predicted from the initial model and corrected SW (dashed), and the GPR traces predicted from the final inverted model (gray). Traces are normalized individually.

Because the ray-based results are good approximations of the "true" model parameters, FIG. 5 illustrates that the effective SW correction alone produced a good fit between the hyperbola from the top of the pipe of the observed and modeled GPR traces. The inversion procedure for the soil

TABLE 1

The correct, initial guess, and inverted parameter values for the synthetic model. Pipe diameter estimate is significantly improved by the inversion process. Soil conductivity and conductivity of the pipe filling are fixed to the ray-based results during FWI.

| Parameter | Correct value | Ray-based estimation | FWI result with the ray-based results as the starting model | Estimation error (%) |
|---|---|---|---|---|
| Relative permittivity of the soil | 5 | 5.1 | 5.09 | 1.8 |
| Electrical conductivity of the soil (mS/m) (fixed) | 2 | 2.3 | — | — |
| Relative permittivity of pipe-filling material (water) | 80 | 80 | 78.5 | 2.25 |
| Electrical conductivity of pipe-filling material (water) (mS/m) | 1 | 2.5 | — | — |
| X (center of the pipe) (cm) | 50 | 49.95 | 49.95 | 0.1 |
| Depth of the top of the pipe (cm) | 35 | 33.65 | 35.08 | 0.23 |
| Pipe wall thickness (mm) (fixed) | 3 | — | — | — |
| Pipe inner diameter (cm) | 10 | 11.5 | 10.12 | 1.2 |
| Pipe relative permittivity (PVC) (fixed) | 3 | — | — | — |
| Pipe electrical conductivity (mS/m) (PVC) (fixed) | 10 | — | — | — |

The ray-based analysis was applied to the synthetic GPR data (FIG. 3c) assuming the pipe to be water filled. The ray-based analysis estimated the diameter with 15% error (Table 1). In contrast, an air-filling assumption resulted in an approximately 10%-30% error in diameter estimation. Lateral position and soil average permittivity and conductivity were well-estimated using the ray-based analysis (Table 1). The 3D to 2D transformation was applied, and the transformed data were then treated as the "observed data" in the inversion process.

and pipe properties and dimensions then brings improved alignment of the bottom of pipe diffraction returns (FIG. 5) and reduces errors (Table 1). For instance, the ray theory estimated the pipe's inner diameter to be 11.5 cm, whereas the FWI process improved this estimate model parameter to 10.12 cm (1.2% error). The estimated depth also showed an improvement after the FWI process.

Figure 6A:
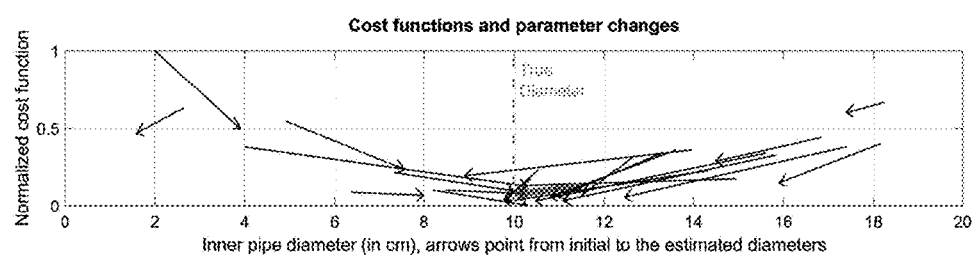
FIG. 6A is a graph of cost function values associated with the initial guess (tail of arrow) and the inversion output (tip of the arrow) for 22 runs. Note that in each run, the initial values of the other variables in the inversion also vary. The cost function changes with the inner pipe diameter. The dashed gray line marks the true (simulated) 10 cm pipe inner diameter.
Figure 6B:
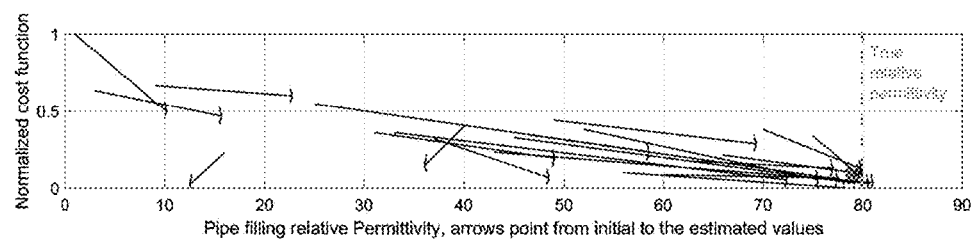
FIG. 6B is a graph of cost function values associated with the initial guess (tail of arrow) and the inversion output (tip of the arrow) for 22 runs. Note that in each run, the initial values of the other variables in the inversion also vary. The cost function changes with the infilling relative permittivity. The dashed gray line marks the true pipe filling relative permittivity of 80. With starting values of pipe diameter within a factor of two of the correct value, the inversion improves the estimate of the pipe diameter. The bold gray arrows show the inversion run with starting parameters from the ray-based analysis, listed in Table 1.

To study the effect of the initial value selection on the FWI results, the FWI process was run 22 times for this case, in each case varying the permittivity of the pipe filling material and pipe diameter as initial model parameters. In each case, the effective SW was computed with the model medium properties. The initial values were specified in 15 cases by randomly varying values in a Gaussian distribution around the best fit inversion results of Table 1 with a standard deviation of 50% of the ray-based result and then in seven cases by randomly assigning more extreme outliers to selected parameters (a comprehensive examination of all five inversion parameters were computationally not feasible and outside the scope of this experiment). FIG. 6 summarizes the changes in cost function from the initial value to the final inversion value for all runs, for the pipe's inner diameter (FIG. 6a) and the pipe-filling relative permittivity (FIG. 6b). Note that only the first and last steps of the inversion process are shown as the tail and tip of the arrows; the successive changes in parameters through multiple iterations are not shown.

FIG. 6a shows that the diameter estimates are improved for all starting values within a factor of two of the true value. Many initial models converge at a 1-2 mm overestimate of the pipe's diameter, but the ray-based analysis starting model yielded a final diameter only 0.12 mm greater than the true value, a difference less than the 1 mm cell size in the forward models. From FIG. 6b, it can be concluded that inversions starting with significantly lower initial assigned in-filling relative permittivity values (<50) and initial pipe diameters that differed from the true diameter by more than 50% failed to reach within 10% of the true value. Lower initial pipe-filling relative permittivity (≤50) also significantly increased the time for convergence. A more detailed discussion of starting models to the more realistic field case studies is described below.

The synthetic model results above show that this FWI method is effective for improving estimates of pipe dimensions in highly idealized conditions. The effects of realistic soil heterogeneities are missing.

The present invention is also useful for more accurately determining the characteristics of any underground objects, including subsets of the surrounding media. For example, the method described above can be tailored to determine the characteristics of non-cylindrical underground objects, underground objects made of material impervious to GPR waves, or sections of the underground media like rock beds, boulders, or water tables and natural aquifers.

When determining the characteristics of underground objects that are impervious to GPR waves, the permittivity and conductivity of the infilling material parameters can be removed or set as constants. If these parameters can be accurately determined based on the knowledge of the site, then those parameters can remain constant.

Ultimately, this invention can be used to provide more accurate determinations of the true values of any of the parameters that can be estimated by the GPR data. When only a certain parameter or subset of parameters are of interest, the remaining parameters can be removed from the process or set as constants.

Case Studies of PVC Pipe in Well-Sorted Sands

The inversion method was tested with GPR profiles run across a buried PVC pipe of known position and dimensions. The field tests were run in the Geopark of the University of South Florida in Tampa, Fla., USA. There, the uppermost 1-2 m consists of well-sorted loose sand over progressively siltier and clay-rich layers.

Figure 7:
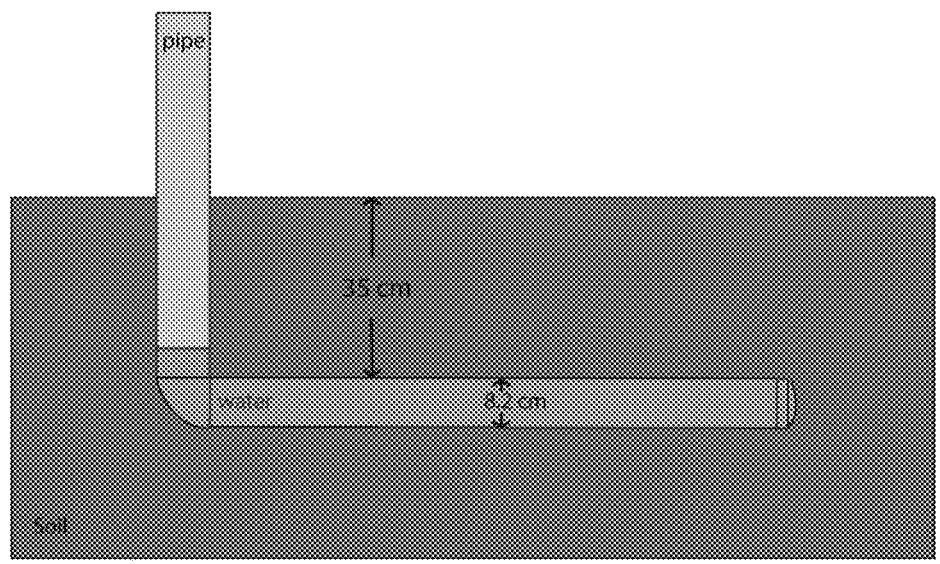
FIG. 7 is a schematic sketch of the pipe buried in sand. The moderate gray color shows the water level in the pipe.

Several reconnaissance GPR profiles were collected to find an area with few tree roots and low degree of soil disturbance. Once a preferred location was found, a trench was excavated to bury a PVC pipe. The selected PVC pipe had an outer diameter of 8.2 cm and a wall thickness of 3 mm, and it was placed so that the top of the pipe lay 35 cm below the ground surface. One end of the horizontal PVC pipe was closed with a PVC lid, and the other end was connected to another vertical pipe through a 90° PVC elbow. The "L"-shaped pipe was designed to enable researchers to fill the pipe with liquids (FIG. 7). Once the burial depth of the top of the pipe was confirmed to be the same at the elbow location and the lid, the trench was refilled. Before refilling with the native sand, the sand was sieved to remove small tree roots. Attempts were made to make sure that the soil was as uniformly distributed as possible above the pipe to increase the chances of receiving clear diffracted hyperbolas.

Two subsequent GPR surveys were performed. The first was run on the empty, air-filled pipe on the same day the pipe was buried. The second was run almost six weeks later. Although the soil was quite dry on the day of the survey, there had been heavy rains in the six weeks since the pipe was installed, so it is assumed that the soil over the trench had settled and compacted to a degree more similar to undisturbed neighboring soil. For this second survey, the pipe was completely filled with fresh water.

Case Study 1: Water-filled Pipe

Figure 8:
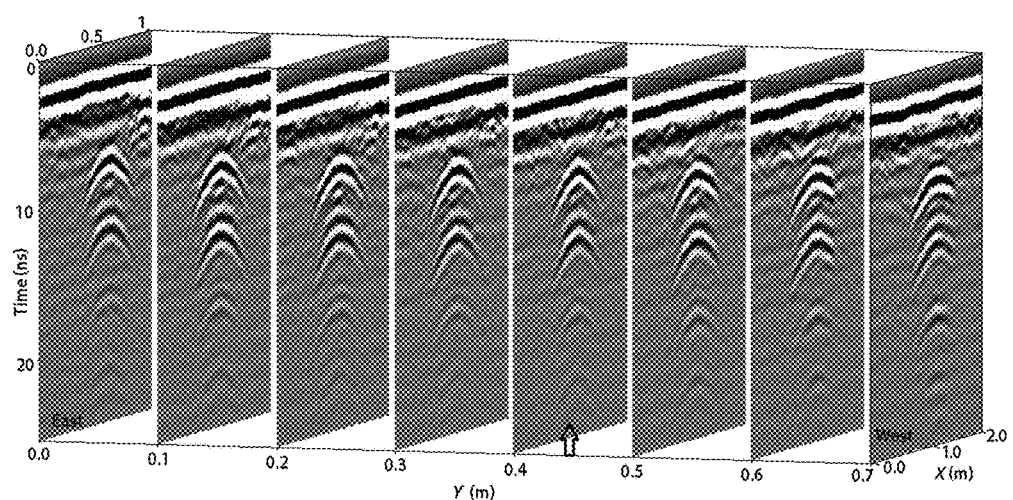
FIG. 8 is a series of profiles of the water-filled pipe buried in sand. The left-most left plot is closest to the pipe elbow; the right-most right plot is closest to the lid. Diffracted hyperbolas are recorded from the top and bottom of the pipe, at all locations. The arrow shows the profile used for FWI.

After the pipe was filled with water, as illustrated in FIG. 7, a grid of 15 parallel profiles was acquired, with 5 cm spacing between profiles (a subset is shown in FIG. 8). All profiles were run in a north-south direction, perpendicular to the pipe that was laid in an east-west direction. A Mala-ProEx system with 800 MHz shielded antennas was used. The spacing between traces along each profile was set to 8.5 mm and was controlled by an odometer wheel that was calibrated on site. The 80 traces centered on the hyperbola were selected to use in the inversion process. The water-filled pipe produced sharp hyperbolas in all the GPR profiles.

For a water-filled pipe, distinct reflections from the top and bottom of pipe are anticipated if the pipe diameter is greater than approximately half the radar wavelength. For this scenario, a wavelength of approximately 4 cm was expected; the pipe diameter of 7.6 cm is almost twice this value. Clear hyperbolas were indeed observed from top and bottom of the pipe in all 15 profiles. The central profile marked by the arrow in FIG. 8 has one of the cleanest pipe returns recorded, and it was selected for the FWI.

Figure 10:
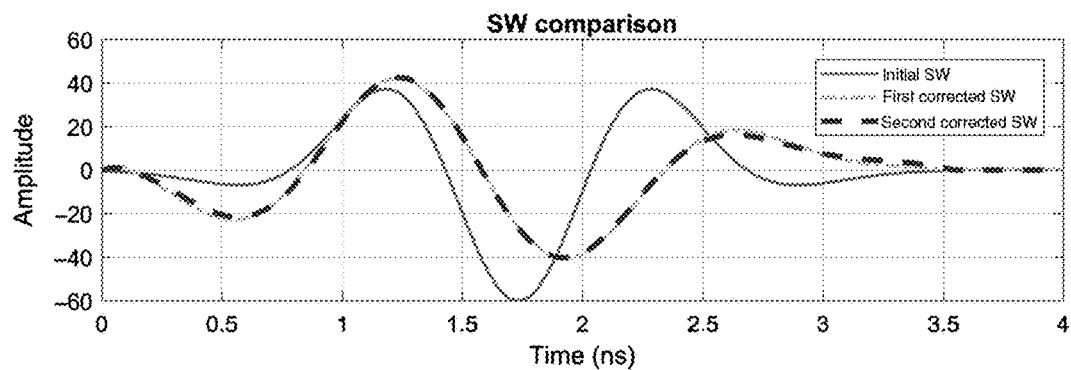
FIG. 10 is a graph of the initial and corrected effective SWs. The second corrected SW has an overall shape similar to the fourth Gaussian derivative, but it is not symmetric.

From the selected profile, the closest 80 traces to the pipe were extracted for the FWI (FIG. 8). The optimal data range and trace spacing for inversion is site dependent and outside the scope of this study. The ray-based analysis was performed on the selected data set (Table 2) followed by the 3D to 2D transformation. FIG. 10 presents the 80 traces after basic filtering, including a 4 ns dewow filter, a time-zero correction, a high-cut 1600 MHz frequency filter, an average xy filter with a 3×3 window size (this subjectively chosen window size smooths the data slightly, does not generally affect amplitudes on average by more than 1%, and improves the performance of the inversion process), and a 3D to 2D transformation.

TABLE 2

Sample inversion results for air- and water-filled pipes. Ray-based analysis results are used as the initial values in the FWI. Soil conductivity and pipe-filling conductivity are fixed to the ray-based results during FWI.

| Case | Parameter | Correct value | Ray-based estimation | FWI result with the ray-based results as the starting model | Estimation error (%) |
|---|---|---|---|---|---|
| Water-filled pipe | Relative permittivity of the soil | — | 5.822 | 5.85 | — |
| | Electrical conductivity of the soil (mS/m) (fixed) | — | 3.2 | — | — |
| | X (center of the pipe) (m) | 1.09 | 1.088 | 1.09 | 0 |
| | Depth of the top of the pipe (cm) | 35 | 33.55 | 34.84 | 0.46 |
| | Pipe wall thickness (mm) (Fixed) | 3 | — | — | — |
| | Pipe inner diameter (cm) | 7.6 | 6.8 | 7.59 | 0.13 |
| | Relative permittivity of the pipe-filling material (water) | — | 80 | 74 | — |
| | Effective electrical conductivity of pipe-filling material (water) (mS/m) (fixed) | — | 0.02 | — | — |
| | Pipe relative permittivity (PVC) (fixed) | — | 3 | — | — |
| | Pipe electrical conductivity (mS/m) (PVC) (fixed) | — | 1 | — | — |
| Air-filled pipe | Relative permittivity of soil | — | 4.52 | 4.6 | — |
| | Electrical conductivity of soil (mS/m) (fixed) | — | 4.23 | — | — |
| | X (center of the pipe) | 1.09 | 1.095 | 1.092 | 0.18 |
| | Depth of the top of the pipe (cm) | 35 | 34.7 | 34.8 | 0.57 |
| | Pipe wall thickness (mm) (fixed) | 3 | — | — | — |
| | Pipe inner diameter (cm) | 7.6 | Between 3 and 30 | 8.18 (starting value = 12) | 7.6 |
| | Relative permittivity of the pipe-filling material (air) | 1 | 1 | 1 | 0 |
| | Effective electrical conductivity of the pipe-filling material (air) (mS/m) (fixed) | 0 | — | — | — |
| | Pipe relative permittivity (PVC) (fixed) | — | 3 | — | — |
| | Pipe electrical conductivity (mS/m) (PVC) (fixed) | — | 1 | — | — |

Figure 9:
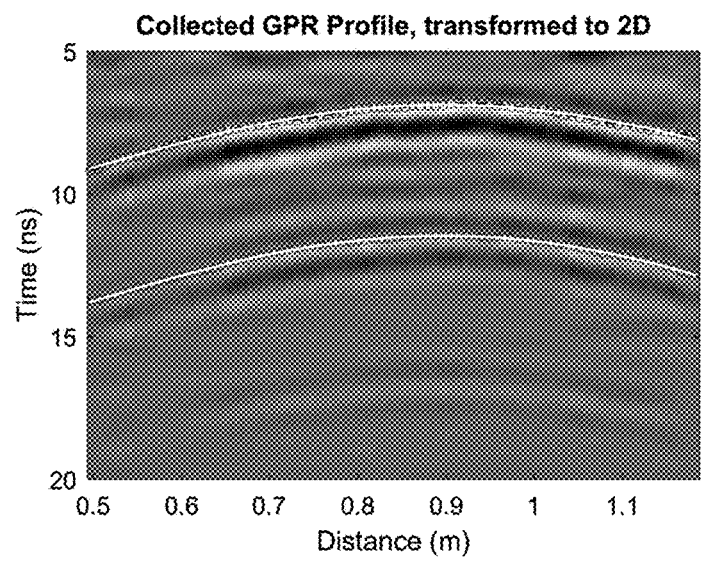
FIG. 9 is a profile over the water-filled pipe, direct wave excluded. The first strong return between 7 and 10 ns is the reflection from the top of the pipe; the second return between 12 and 15 ns is from the bottom of the pipe. The latest weak return between 17 and 19 ns is a multiple. The circles show the arrival time picks used in the ray-based inversion. The white lines show the arrival time curves predicted from the ray-based inversion parameters.

The case study revealed that the inversion procedure yielded better results if the direct wave arrivals were excluded when computing the residuals vector R (equation 4). The direct arrivals were excluded as shown in FIG. 9.

The ray-based analysis was used to create an initial model to start the inversion. Because two diffraction hyperbolas were observed, the liquid-filled assumption was used for the pipe. The ray theory starting estimates are listed in Table 2.

Conductivity values were fixed during FWI, and traces were individually normalized in the cost function calculations. Ray theory estimates the diameter with approximately 10% error if a good infilling permittivity is chosen (Table 2). The permittivity, conductivity, and the wall thickness of the pipe itself (PVC) were assumed to be known and fixed to the actual values.

After setting the initial model parameters as described above, the initial synthetic GPR data were computed assuming a cell size of 1×1 mm in the gprMax 2D forward models and a fourth derivative of the Gaussian wavelet as the SW. Using the deconvolution method, the SW was corrected twice (FIG. 10). This wavelet is similar to that obtained for other data sets using a similar instrument from the same manufacturer.

Figure 11A:
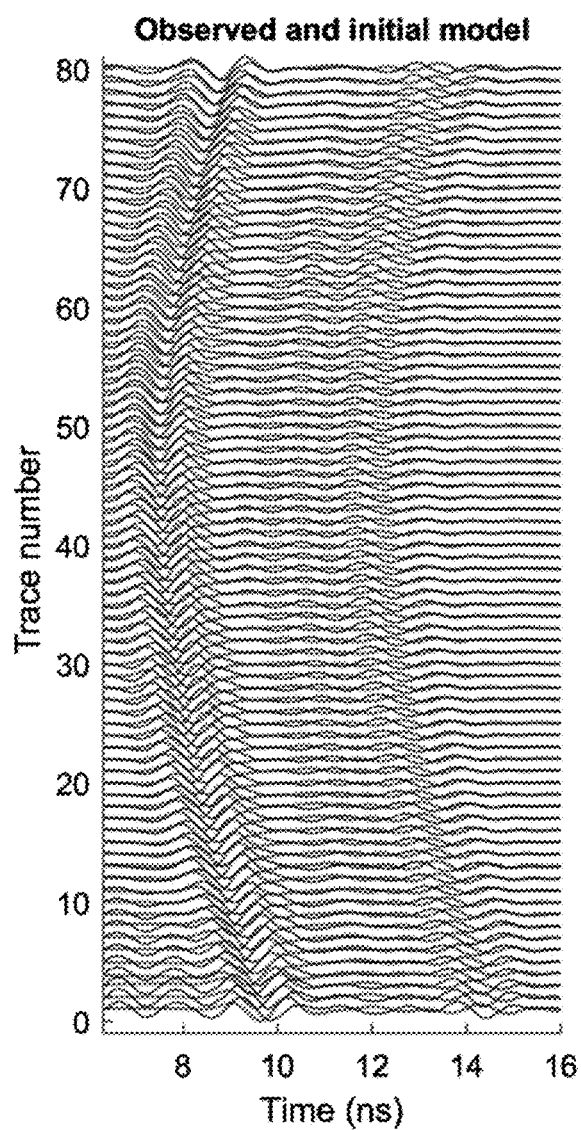
FIG. 11A is a comparison plot of observed data (black) and initial synthetic data (gray).
Figure 11B:
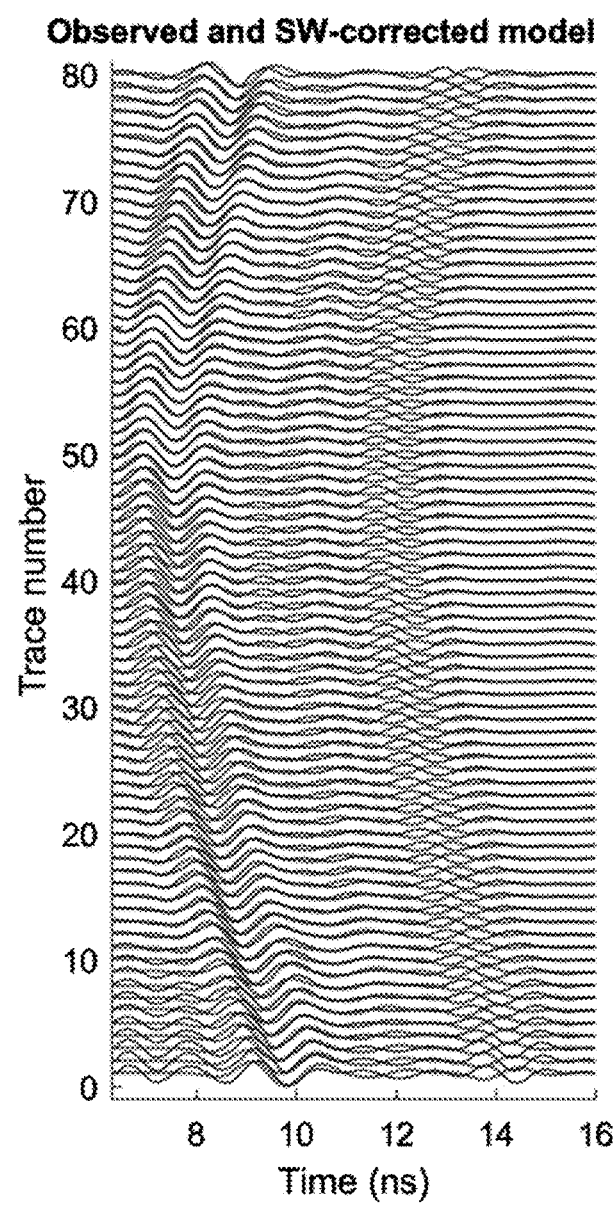
FIG. 11B is the same plot in FIG. 11A after SW correction; the first reflected signals fit better than the previous model.
Figure 11C:
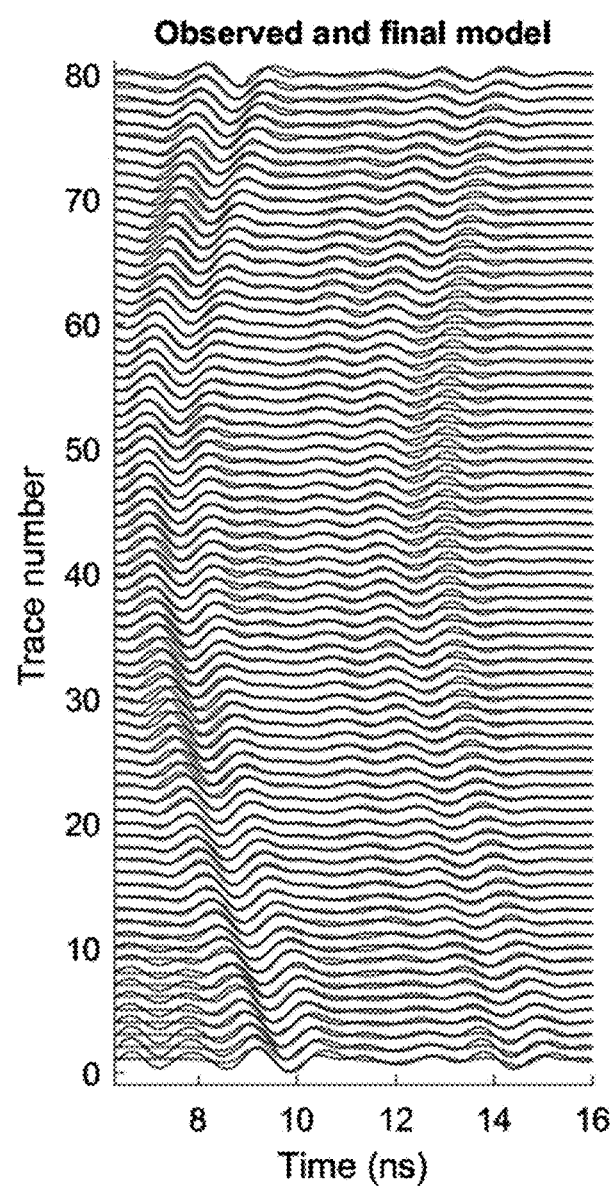
FIG. 11C is the same plot in FIG. 11B after the FWI process. A generally good fit between the observed and modeled data is observed. Traces are normalized individually.

Neither the shape of the first reflected signals from the top of the pipe nor the second reflected signals from the bottom of the pipe were modeled acceptably with the initial guess parameters because the shape of the SW had not been corrected (see FIG. 11A). After the SW correction (FIG. 11B), the reflections from the bottom of the pipe were still poorly fit because the initial model still misestimated the pipe diameter. After 17 iterations, the model and observed data fit was far superior (FIG. 11C).

The inversion process maintained values for pipe-filling material that were close to the expected values for fresh water (see Table 2). The depth and pipe diameter were recovered to within 1% of their known values.

Figure 12A:
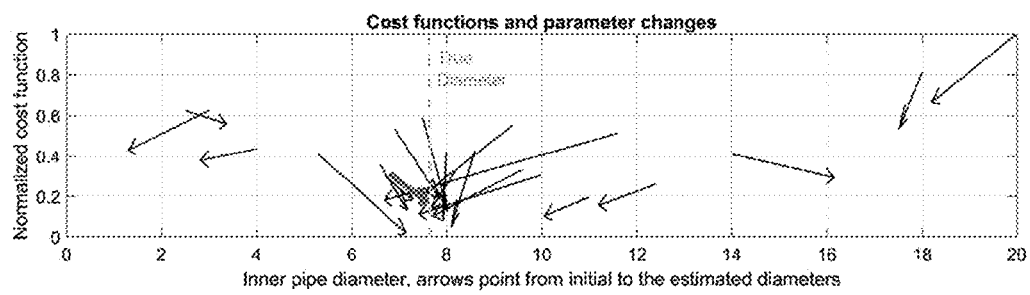
FIG. 12A is a graph of cost function values associated with the initial guess (tail of arrow) and inversion output (tip of the arrow) for 20 runs. Note that in each run, the initial values of the other variables in the inversion also vary. The thick gray arrows belong to the inversion starting from the ray-based analysis listed in Table 2. The cost function changes with the inner pipe diameter. The dashed gray line marks the known 7.6 cm pipe inner diameter. With starting values of pipe diameter within 50% of the correct value, the inversion improves the estimate of the pipe diameter.
Figure 12B:
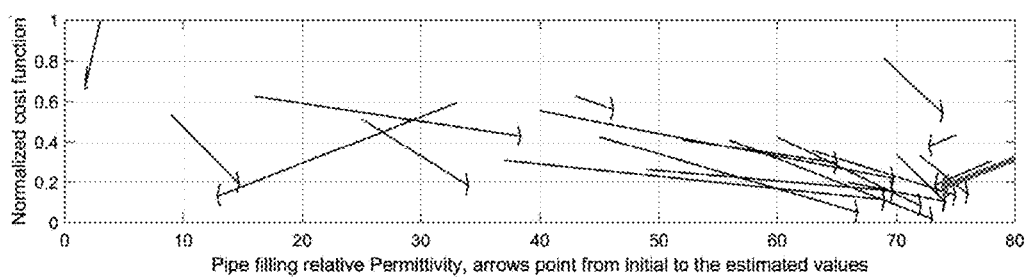
FIG. 12B is a graph of cost function values associated with the initial guess (tail of arrow) and inversion output (tip of the arrow) for 20 runs. Note that in each run, the initial values of the other variables in the inversion also vary. The thick gray arrows belong to the inversion starting from the ray-based analysis listed in Table 2. The cost function changes with infilling relative permittivity.

To investigate the sensitivity of the inversion algorithm to the initial values, the FWI process was run 20 times for the water-filled pipe case, similar to the process described above for the synthetic model. FIG. 12 summarizes the changes in cost function from the initial value to the final inversion value for the 20 runs, for the pipe inner diameter (FIG. 12A) and the pipe-filling relative permittivity (FIG. 12B).

FIG. 12 illustrates that models with initial pipe diameters between 5 and 10 cm converge to within 1 cm of the 7.6 cm correct value. Models with more widely different starting values end up at local minima of the cost function.

Case Study 2: Air-filled Pipe

On the same day that the pipe was buried, GPR profiles were collected using the 800 MHz antenna with the same settings as the previous section, but the pipe was empty. An air-filled pipe should produce weaker reflections and a shorter time gap between the upper and lower returns. Presumably, also the sand covering the pipe was less uniformly compacted and drier on the day of burial than six weeks later, and thus more "background noise" and a longer incoming wavelength was expected in this case. These factors combine to make the FWI in this case more challenging, designed to illustrate the efficiency of this technique in a more complex case.

Figure 13:
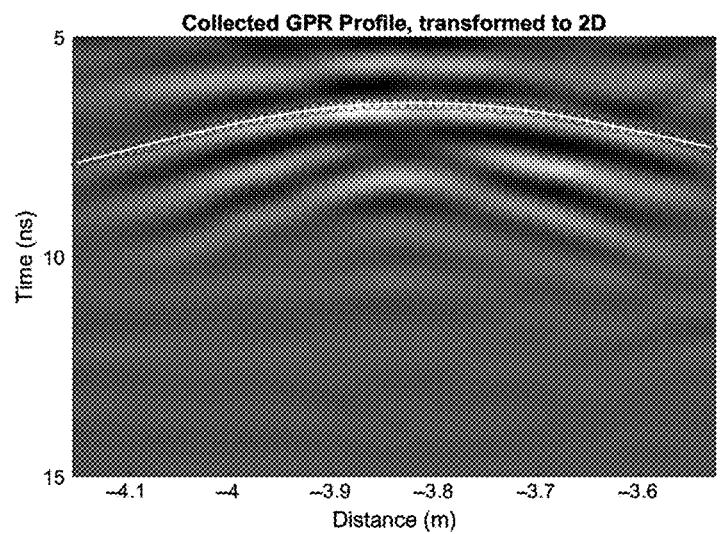
FIG. 13 is the GPR profile over the air-filled pipe, direct wave excluded. A primary reflection from the top of the pipe is observed between 6 and 9 ns. Dewow, zero-time correction, band pass, and average xy filters are applied with the same settings as for the water-filled pipe (FIG. 9). Data are transformed to two dimensions. The circles show the arrival-time picks used in the ray-based inversion. The white line shows the arrival-time curves predicted from the ray-based inversion parameters.

A GPR profile (FIG. 13) was selected for the inversion procedure at the same location of the inverted profile in case study 1. Comparing FIGS. 9 and 13 illustrates the expected effects of water versus air and soil compaction. The air-filled pipe produces less pronounced and overlapping diffraction hyperbolas. There is also some scattered energy recorded before the hyperbolas, as anticipated due to heterogeneity in the sand. Using the ray-based scheme, the average sand relative permittivity was estimated to be 4.52, i.e., an average velocity of almost 0.14 m/ns, indicating that the sand was much dryer at the time of this survey than at the time of the later survey over the water-filled pipe. The depth and the lateral location of the pipe were well-estimated from the ray-based analysis (Table 2). Because there is just one hyperbola recorded from the pipe, the diameter and pipe-filling conductivity estimation were challenging. Traditional hyperbola fitting anticipates the pipes within diameter of 3-30 cm to be a fit to these data. Because the starting model parameters should be provided for FWI, the initial diameter of the pipe is set to 12 cm for the sample run. The pipe was assumed to be filled with air, and the appropriate permittivity and conductivities were assigned.

Figure 14:
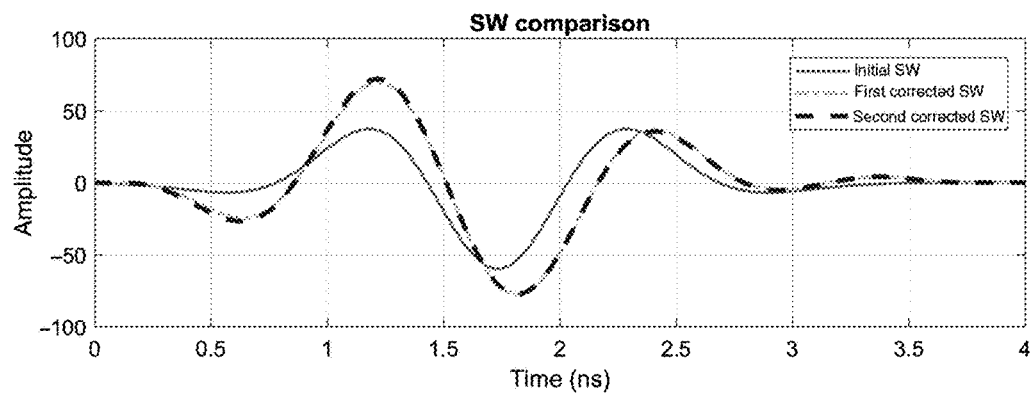
FIG. 14 is a graph of the initial and corrected effective SWs for the air-filled pipe.
Figure 15A:
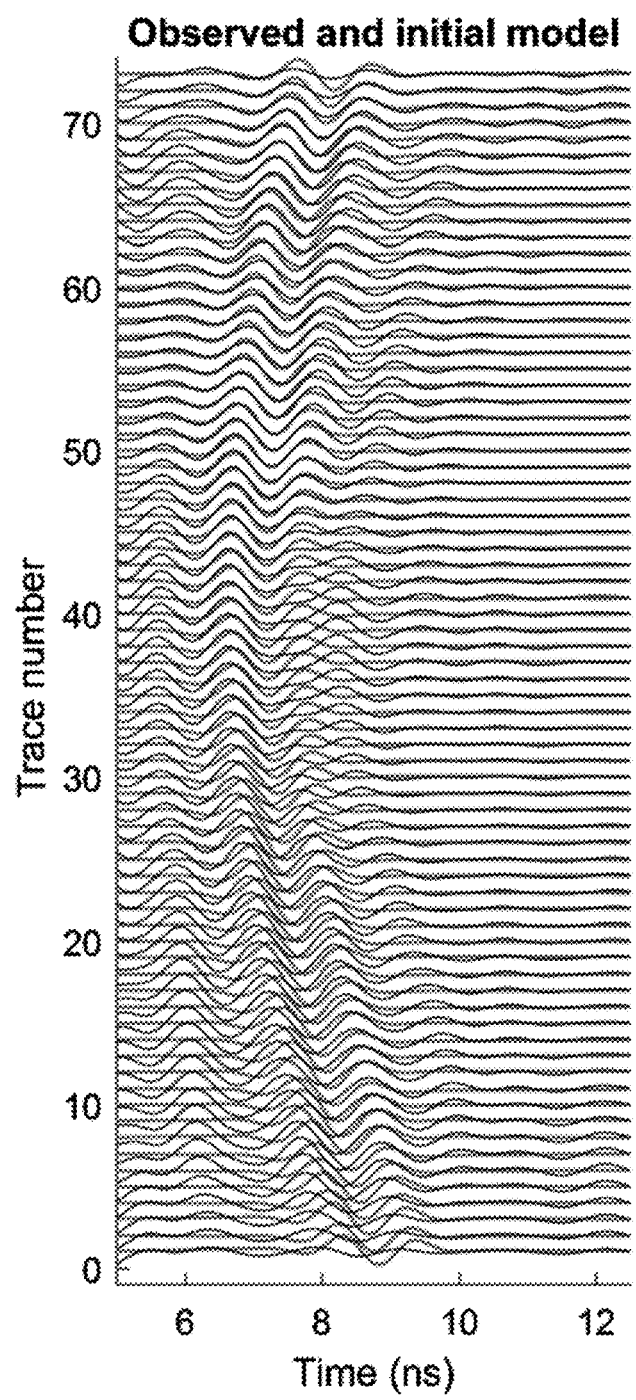
FIG. 15A is a comparison plot of the observed data (black) and initial synthetic data (gray).
Figure 15B:
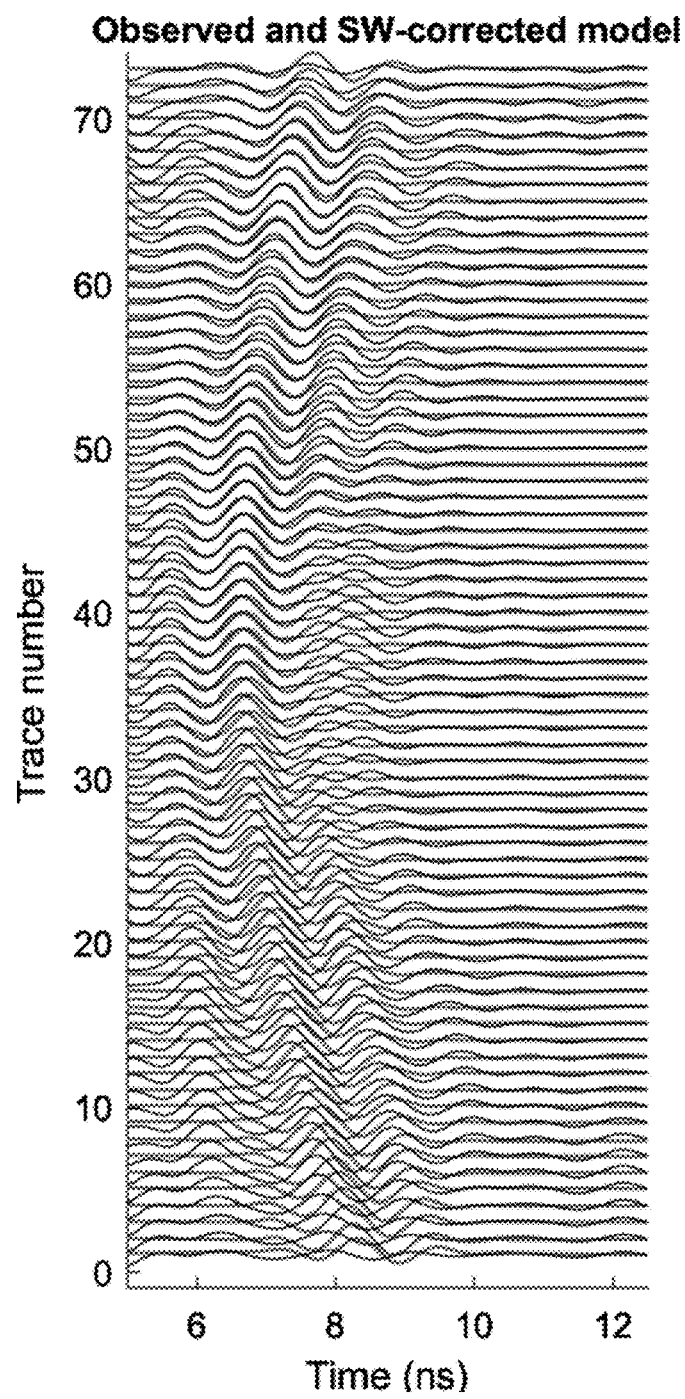
FIG. 15B is the same plot in FIG. 15A after SW correction; the first reflected signals fit better than the previous model.
Figure 15C:
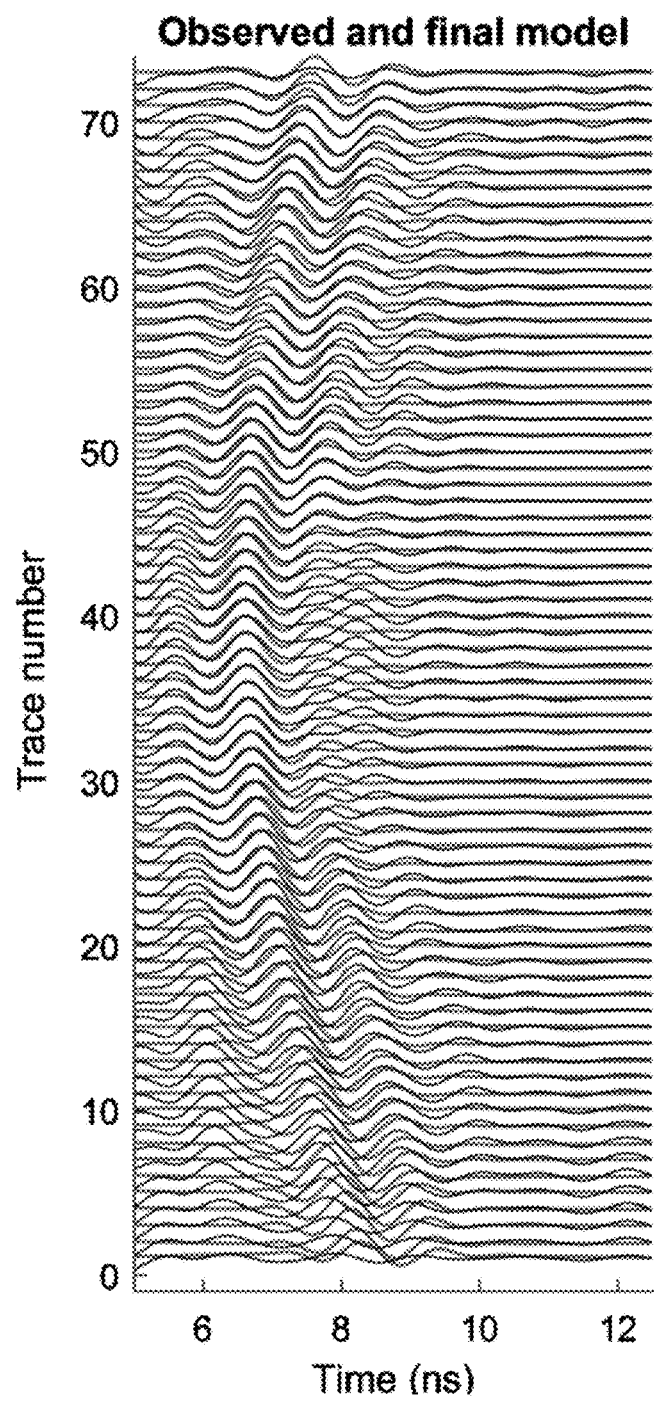
FIG. 15C is the same plot in FIG. 15B after the FWI process.

The 3D to 2D transformation, effective SW estimation (FIG. 14), and inversion procedure and assumptions were identical to those described for the water-filled pipe. Similar to two previous cases, the unknowns assigned to the inversion procedure are the pipe position, pipe diameter, and soil and pipe-filling permittivities. Initial parameter values for a sample run are listed in Table 2, and the inversion results are presented in FIGS. 15.

The final model after FWI is an improved but clearly imperfect fit to the real data, with the inverted parameter values listed in Table 2. Misfits are presumably caused in part by unmodeled soil heterogeneities. The pipe dimension is recovered with 8% error.

Figure 16A:
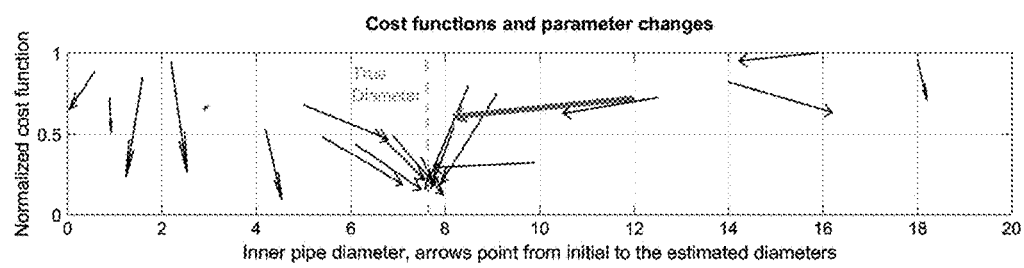
FIG. 16A is a graph of cost function values associated with the initial guess (tail of the arrow) and the inversion output (tip of arrow) for 20 runs. The thick gray arrows belong to the inversion included in Table 2. The cost function changes with the inner pipe diameter. The dashed gray line marks the known 7.6 cm pipe inner diameter.
Figure 16B:
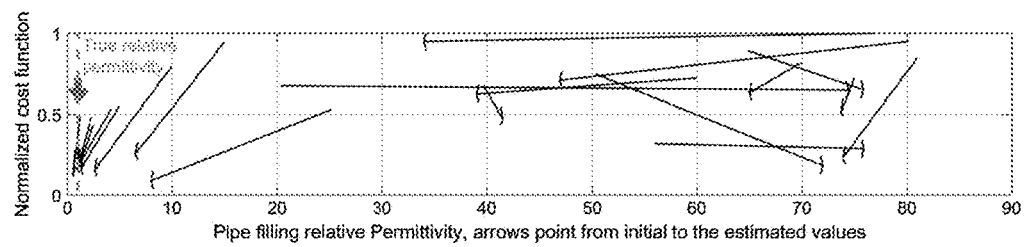
FIG. 16B is a graph of cost function values associated with the initial guess (tail of the arrow) and the inversion output (tip of arrow) for 20 runs. The thick gray arrows belong to the inversion included in Table 2. The cost function changes with the infilling relative permittivity. The dashed gray line marks one as the relative permittivity of air. The inversion process clearly targets local minima if the initial estimate of pipe-filling permittivity is poor.

To investigate the quality of inversion results and assess local minima of the cost function, 20 different models were run with different starting parameters (permittivity of pipe filling and diameter and depth). The SW was estimated for each of the tests separately. FIG. 16 summarizes the changes in the cost function from the initial value to the final inversion value for the 20 runs, for the pipe inner diameter (FIG. 16A) and the pipe-filling relative permittivity (FIG. 16B). Because of the interference (overlap) in returns between the top of the pipe and the bottom of the pipe in the air-filled case, models that started with initial diameters significantly too large or too small fail to account for the overlap and yield SWs that look dramatically different from those of the better models. This in turn yielded unsatisfactory inversion results, underscoring the importance of the initial model. These tests for the air-filled case suggest that the initial models with diameters within 30% of the true diameter are consistently improved in the inversion process.

Results

In these simple field tests, the pipe diameter estimates are significantly improved when the initial guess is within approximately 50% of the true value for the water-filled pipe with distinct returns from the top and bottom, and within approximately 30% of the true value for the air-filled pipe. With the good initial guess, inversion generally proceeds to within 1 cm or less of the true value (in this case to <8% error). This is an improvement over the traditional ray-based scheme, in which the diameter is estimated by trial-and-error fit of the observed hyperbola to the expected arrival times for returns over pipes of varying sizes. As previously described, the trial-and-error fit for the air-filled pipe case (inner diameter 7.6 cm) yielded reasonable results for diameters ranging from 3 to 30 cm.

This method in its current form is thus suitable for improving good starting estimates of the pipe diameter in simple cases with isolated diffraction hyperbolas. Examination of model runs such as those shown in Tables 1 and 2 and FIG. 12 shows that the initially good pipe diameter estimates are also typically slightly improved in the inversion. Conductivity values are fixed to the ray-based analysis results, for the reasons described for previous cases above. To obtain conductivities, the SW could be updated during the FWI following a process similar to Busch et al. (2012, 2014).

The method described here suggest that starting model estimates must be sufficiently good such that synthetic data pulses are offset less than a half wavelength from the measured traces. For the clean synthetic data, this criterion can be met with a model that assumes a permittivity within 50% of the correct value, and the inversion proceeds toward a permittivity closer to the correct value. For the field data case in which two diffracted hyperbolas are recorded, ray theory can provide good starting model parameters for the FWI process. In the cases of gas-filled pipes (or very narrow liquid-filled cylinders, such as tree roots) that are likely to generate just one diffraction hyperbola, the ray theory fails to provide good starting models; in this case, the best judgment of the user must be used to set the initial model parameters. In this sense, a successful inversion confirms the initial guess, whereas a failure to converge or a small reduction in cost function suggests a poor starting model. These results indicate that this new method for FWI of common-offset GPR data is effective at estimating the dimensions and infilling material of buried pipes.

Glossary of Claim Terms

Broadside Orientation: is any orientation perpendicular to the surface or ground.

Cost Function: is a measure of overall difference between the collected and modelled data. Lowering the cost function is equivalent to finding a model that is closer to the real subsurface model.

Dewow Filter: is an operator (filter) that removes the initial low frequency signal component (wow low frequency signal trend) inherent in GPR signals.

Diffraction Hyperbola: is the typical term used for referring to the upside-down U-shaped GPR signal returns from cylindrical or point diffractor.

Media: is any surrounding material.

Pipe: is any cylindrical hollow structure.

Source Wavelet: is the electromagnetic pulse transmitted by the transmitter GPR antenna into the subsurface. It depends on the instrument, media, ground coupling and moisture.

Time-Zero corrections: is a signal processing filter that sets the arrival of the first signal measured at the receiver to the time expected for the air wave to travel between transmitter and receiver. This filter is necessary for correcting the arrival time of any GPR returns.

References

André, F., M. Jonard, and S. Lambot, 2015, Non-invasive forest litter characterization using full-wave inversion of microwave radar data: IEEE Transactions on Geoscience and Remote Sensing, 53, 828-840, doi: 10.1109/TGRS.2014.2328776.

Benedetto, A., and L. Pajewski, 2015, Civil engineering applications of ground penetrating radar: Springer Transactions in Civil and Environmental Engineering.

Booth, A., R. A. Clark, and T. Murray, 2011, Influences on the resolution of GPR velocity analyses and a Monte Carlo simulation for establishing velocity precision: Near Surface Geophysics, 9, 399-411, doi: 10.3997/1873-0604.2011019.

Bumpus, P. B., and S. Kruse, 2014, Case history: Self-potential monitoring for hydrologic investigations in urban covered-karst terrain: Geophysics, 79, no. 6, B231-B242, doi: 10.1190/geo2013-0354.1.

Busch, S., J. van der Kruk, J. Bikowski, and H. Vereecken, 2012, Quantitative conductivity and permittivity estimation using full-waveform inversion of on-ground GPR data: Geophysics, 77, no. 6, H79-H91, doi: 10.1190/GE02012-0045.1.

Busch, S., J. van der Kruk, and H. Vereecken, 2014, Improved characterization of fine-texture soils using on-ground GPR full-waveform inversion: IEEE Transactions on Geoscience and Remote Sensing, 52, 3947-3958, doi: 10.1109/TGRS.2013.2278297.

Busch, S., L. Weihermuller, J. A. Huisman, C. M. Steelman, A. L. Endres, H. Vereecken, and J. Kruk, 2013, Coupled hydrogeophysical inversion of time-lapse surface GPR data to estimate hydraulic properties of a layered subsurface: Water Resources Research, 49, 8480-8494.

Cassidy, N. J., 2009, Ground penetrating radar data processing, modelling and analysis, in Harry, M. J., ed., Ground penetrating radar: theory and applications, Elsevier, 141-176

Crocco, L., G. Prisco, F. Soldoveiri, and N. J. Cassidy, 2009, Early-stage leaking pipes GPR monitoring via microwave tomographic inversion: Journal of Applied Geophysics, 67, 270-277.

De Coster, A., A. P. Tran, and S. Lambot, 2016, Fundamental analyses on layered media reconstruction using GPR and full-wave inversion in near- field conditions: IEEE Transactions on Geoscience and Remote Sensing, 54, 5143-5158, doi: 10.1109/TGRS.2016.2556862.

Demirci, S., E. Yigit, I. H. Eskidemir, and C. Ozdemir, 2012, Ground penetrating radar imaging of water leaks from buried pipes based on back projection method: NDT&E International, 47, 35-42.

Doherty, J., 2010, PEST model-independent parameter estimation user manual, 5th ed.: Watermark Numerical Computing.

Doherty, J., 2015, Calibration and uncertainty analysis for complex environmental models, PEST: Complete theory and what it means for modelling the real world: Watermark Numerical Computing.

Doherty, J., 2017, PEST, http://www.pesthomepage.org/, accessed 1 Aug. 2017.

Dou, Q., L. Wei, D. R. Magee, and A. G. Cohn, 2017, Real-time hyperbola recognition and fitting in GPR data: IEEE Transactions on Geoscience and Remote Sensing, 55, 51-62.

Ernst, J. R., A. G. Green, H. Maurer, and K. Holliger, 2007, Application of a new 2D time-domain full-waveform inversion scheme to crosshole radar data: Geophysics, 72, no. 5, J53-J64, doi: 10.1190/1.2761848.

Fisher, S. C., R. R. Stewart, and H. M. Jol, 1992, Processing ground penetrating radar (GPR) data: CREWES Research Report 4, 11-2-11-22.

Forbriger, T., L. Groos, and M. Schafer, 2014, Line-source simulation for shallow-seismic data. Part 1: Theoretical background: Geophysical Journal International, 198, 1387-1404, doi: 10.1093/gji/ggu199.

Giannopoulos, A., 2005, Modelling ground penetrating radar by GprMax: Construction and Building Materials, 19, 755-762, doi: 10.1016/j.conbuildmat.2005.06.007.

Grandjean, G., J. C. Gourry, and A. Bitri, 2000, Evaluation of GPR techniques for civil-engineering applications: study on a test site: Journal of Applied Geophysics, 45, 141-156.

Gueting, N., A. Klotzsche, J. van der Kruk, J. Vanderborght, H. Vereecken, and A. Englert, 2015, Imaging and characterization of facies heterogeneity in an alluvial aquifer using GPR full-waveform inversion and cone penetration tests: Journal of Hydrology, 524, 680-695, doi: 10.1016/j.jhydrol.2015.03.030.

Gueting, N., T. Vienken, A. Klotzsche, J. van der Kruk, J. Vanderborght, J. Caers, H. Vereecken, and A. Englert, 2017, High resolution aquifer characterization using crosshole GPR full-waveform tomography: Comparison with direct-push and tracer test data: Water Resources Research, 53, 49-72, doi: 10.1002/2016WR019498.

Janning, R., A. Busche, T. Horvath, and L. Schmidt-Thieme, 2014, Buried pipe localization using an iterative geometric clustering on GPR data: Artificial Intelligence Review, 42, 403-425, doi: 10.1007/s10462-013-9410-2.

Jazayeri, S., and S. Kruse, 2016, Full-waveform inversion of ground-penetrating radar (GPR) data using pest (FWI-pest method) applied to utility detection: 86th Annual International Meeting, SEG, Expanded Abstracts, 2474-2478, doi: 10.1190/segam2016-13878165.1.

Kalogeropoulos, A., J. van der Kruk, J. Hugenschmidt, S. Busch, and K. Merz, 2011, Chlorides and moisture assessment in concrete by GPR full waveform inversion: Near Surface Geophysics, 9, 277-285, doi: 10.3997/1873-0604.2010064.

Keskinen, J., A. Klotzsche, M. C. Looms, J. Moreau, J. van der Kruk, K. Holliger, L. Stemmerik, and L. Nielsen, 2017, Full-waveform inversion of crosshole GPR data: Implications for porosity estimation in chalk: Journal of Applied Geophysics, 140, 102-116, doi: 10.1016/j.jappgeo.2017.01.001.

Klotzsche, A., J. van der Kruk, J. Bradford, and H. Vereecken, 2014, Detection of spatially limited high-porosity layers using crosshole GPR signal analysis and full-waveform inversion: Water Resources Research, 50, 6966-6985, doi: 10.1002/2013WR015177.

Klotzsche, A., J. van der Kruk, N. Linde, J. A. Doetsch, and H. Vereecken, 2013, 3-D characterization of high-permeability zones in a gravel aquifer using 2-D crosshole GPR full-waveform inversion and waveguide detection: Geophysical Journal International, 195, 932-944, doi: 10.1093/gji/ggt275.

Klotzsche, A., J. van der Kruk, G. A. Meles, J. A. Doetsch, H. Maurer, and N. Linde, 2010, Full-waveform inversion of crosshole ground penetrating radar data to characterize a gravel aquifer close to the Thur River, Switzerland: Near Surface Geophysics, 8, 631-646, doi: 10.3997/1873-0604.2010054.

Klotzsche, A., J. van der Kruk, G. Meles, and H. Vereecken, 2012, Crosshole GPR full-waveform inversion of waveguides acting as preferential flow paths within aquifer systems: Geophysics, 77, no. 4, H57-H62, doi: 10.1190/geo2011-0458.1.

Lambot, S., E. C. Slob, I. van den Bosch, B. Stockbroeckx, and M. Vanclooster, 2004, Modeling of ground-penetrating radar for accurate characterization of subsurface electric properties: IEEE Transactions on Geoscience and Remote Sensing, 42, 2555-2568, doi: 10.1109/TGRS.2004.834800.

Lavoué, F., R. Brossier, L. Métivier, S. Garambois, and J. Virieux, 2014, Two-dimensional permittivity and conductivity imaging by full waveform inversion of multioffset GPR data: A frequency-domain quasi-Newton approach: Geophysical Journal International, 197, 248-268, doi: 10.1093/gji/ggt528.

Lester, J., and L. E. Bernold, 2007, Innovative process to characterize buried utilities using ground penetrating radar: Automation in Construction, 16, 546-555, doi: 10.1016/j.autcon.2006.09.004.

Liu, H., and M. Sato, 2014, In situ measurement of pavement thickness and dielectric permittivity by GPR using an antenna array: NDT&E International, 64, 65-71, doi: 10.1016/j.ndteint.2014.03.001.

Liu, H., X. Xie, K. Takahashi, and M. Sato, 2014, Groundwater level monitoring for hydraulic characterization of an unconfined aquifer by common mid-point measurements using GPR: JEEG, 19, 259-268, doi: 10.2113/JEEG19.4.xx.

Loeffler, O., and M. Bano, 2004, Ground penetrating radar measurements in a controlled vadose zone: Influence of the water content: Vadose Zone Journal, 3, 1082-1092.

Mahmoudzadeh Ardakani, M. R., D. C. Jacques, and S. Lambot, 2016, A layered vegetation model for GPR full-wave inversion: IEEE Journal of Selected Topics in Applied Earth Observations and Remote Sensing, 9, 18-28, doi: 10.1109/JSTARS.2015.2418093.

Maierhofer, C., H. Reinhardt, and G. Dobmann, 2010, Non-destructive evaluation of reinforced concrete structures, Volume 1: Deterioration processes and standard test methods, 1st ed.: Woodhead Publishing Limited.

Meles, G. A., S. A. Greenhalgh, J. Van der Kruk, A. G. Green, and H. Maurer, 2012, Taming the non-linearity problem in GPR full-waveform inversion for high contrast media: Journal of Applied Geophysics, 78, 31-43, doi: 10.1016/j.jappgeo.2011.12.001.

Meles, G. A., J. Van der Kruk, S. A. Greenhalgh, J. R. Ernst, H. Maurer, and A. G. Green, 2010, A new vector waveform inversion algorithm for simultaneous updating of conductivity and permittivity parameters from combination crosshole/borehole-to-surface GPR data: IEEE Transactions on Geosciences and Remote Sensing, 48, 3391-3407, doi: 10.1109/TGRS.2010.2046670.

Murray, T., A. Booth, and D. M. Rippin, 2007, Water-content of glacier-ice: Limitations on estimates from velocity analysis of surface ground-penetrating radar surveys: JEEG, 12, 87-99.

Ni, S., Y. Huang, K. Lo, and D. Lin, 2010, Buried pipe detection by ground penetrating radar using the discrete wavelet transform: Computers and Geotechnics, 37, 440-448.

Radzevicius, S., 2015, Least-squares curve fitting for velocity and time zero: Presented at the 8th IWAGPR.

Ristic, A. V., D. Petrovacki, and M. Govedarica, 2009, A new method to simultaneously estimate the radius of a cylindrical object and the wave propagation velocity from GPR data: Computers & Geosciences, 35, 1620-1630.

Roberts, R. L., and J. J. Daniels, 1996, Analysis of GPR polarization phenomena: JEEG, 1, 139-157.

Sham, J. F. C., and W. W. L. Lai, 2016, Development of a new algorithm for accurate estimation of GPR's wave propagation velocity by common-off-set survey method: NDT&E International, 83, 104-113.

Tran, A. P., F. André, and S. Lambot, 2014, Validation of near-field ground-penetrating radar modeling using full-wave inversion for soil moisture estimation: IEEE Transactions on Geoscience and Remote Sensing, 52, 5483-5497, doi: 10.1109/TGRS.2013.2289952.

Vacher, L., School of Geosciences, University of South Florida, 2017, USF GeoPark, history of the GeoPark, http://hennarot.forest.usf.edu/main/depts/geosci/facilities/geopark.aspx, accessed 1 August 2017.

Van der Kruk, J., N. Gueting, A. Klotzsche, G. He, S. Rudolph, C. von He- bel, X. Yang, L. Weihermuller, A. Mester, and H. Vereecken, 2015, Quantitative multi-layer electromagnetic induction inversion and full- waveform inversion of crosshole ground penetrating radar data: Journal of Earth Science, 26, 844-850, doi: 10.1007/s12583-015-0610-3.

Villela, A., and J. M. Romo, 2013, Invariant properties and rotation trans-formations of the GPR scattering matrix: Journal of Applied Geophysics, 90, 71-81.

Virieux, J., and S. Operto, 2009, An overview of full-waveform inversion in exploration geophysics: Geophysics, 74, no. 6, WCC1-WCC26, doi: 10.1190/1.3238367.

Warren, C., A. Giannopoulos, and I. Giannakis, 2016, gprMax: Open source software to simulate electromagnetic wave propagation for Ground Penetrating Radar: Computer Physics Communications, 209, 163-170, doi:10.1016/j.cpc.2016.08.020.

Wiwatrojanagul, P., R. Sahamitmongkol, S. Tangtermsirikul, and N. Khamsemanan, 2017, A new method to determine locations of rebars and estimate cover thickness of RC structures using GPR data: Construction and Building Materials, 140, 257-273.

Yang, X., A. Klotzsche, G. Meles, H. Vereecken, and J. van der Kruk, 2013, Improvements in crosshole GPR full-waveform inversion and application on data measured at the Boise Hydrogeophysics Research Site: Journal of Applied Geophysics, 99, 114-124, doi: 10.1016/j.jappgeo.2013.08.007.

Zeng, X., and G. McMechan, 1997, GPR characterization of buried tanks and pipes: Geophysics, 62, 797-806, doi: 10.1190/1.1444189.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method for determining physical properties of a subsurface object disposed in a surrounding media, comprising:
    acquiring measured ground penetrating data from a ground penetrating radar device, wherein the measured ground penetrating data includes at least one measured diffraction hyperbola;
    estimating a plurality of parameters of an initial model of the subsurface object and the surrounding media, such that the initial model produces a simulated diffraction hyperbola that is offset less than one-half a wavelength from the measured diffraction hyperbola, wherein the plurality of parameters includes at least one of the following:
- a velocity of electromagnetic waves through media in which the subsurface object is located;
- a depth of the subsurface object in the surrounding media;
- a horizontal location of the subsurface object;
- a size of the subsurface object;
- a conductivity of the surrounding media;
- a permittivity of the surrounding media;
- a permittivity of any material or fluid within an outer surface of the subsurface object;

acquiring a measured source wavelet and deconvolving the initial model from the measured ground penetrating data to produce a corrected source wavelet;

simulating ground penetrating data for the initial model with the corrected source wavelet; and determining a cost function and adjusting at least one of the plurality of parameters to minimize the cost function.

2. The method of claim 1, wherein the step of adjusting at least one of the plurality of parameters to minimize the cost function includes adjusting every parameter in the plurality of parameters with the exception of the conductivity of the surrounding media.

3. The method of claim 1, further including a step of filtering out high frequency noise from the raw ground penetrating data.

4. The method of claim 1, further including a step of applying a dewow filter to the raw ground penetrating data.

5. The method of claim 1, further including a step of applying time-zero corrections to the raw ground penetrating data.

6. The method of claim 1, further including a step of transforming the initial model from three-dimensional data to two-dimensional data.

7. The method of claim 1, wherein the step of estimating the plurality of parameters of the initial model includes a least squares method for estimating the initial depth of the subsurface object in the media and the initial velocity of the electromagnetic waves through media in which the subsurface object is located.

8. The method of claim 1, wherein the step of creating an initial model of the subsurface object further includes, responsive to receiving two distinct hyperbolas from a top and a bottom of the subsurface object, estimating a diameter of the subsurface object from a root mean square average of a travel time difference between peak amplitudes of the two distinct hyperbolas.

9. The method of claim 1, wherein the step of producing a corrected source wavelet includes more than one iteration of deconvolving the initial model from the measured ground penetrating data.

10. The method of claim 1, wherein the step of adjusting the plurality of parameters to minimize the cost function is performed until the cost function can no longer be minimized.

11. The method of claim 1, further including a step of establishing boundary values for one or more of the plurality of parameters between which the parameters are adjusted in the step of adjusting the plurality of parameters to minimize the cost function.

12. A method for determining the cross-sectional size of an underground pipe, comprising:
- operating a ground penetrating radar device with at least one antenna in a broadside orientation with respect to the underground pipe, wherein the ground penetrating radar device discharges and receives electromagnetic waves;
- acquiring measured ground penetrating data from the ground penetrating radar device, wherein the measured ground penetrating data includes at least one measured diffraction hyperbola;
- estimating a plurality of parameters of an initial model of the underground pipe and the surrounding media, such that the initial model produces a simulated diffraction hyperbola that is offset less than one-half a wavelength from the measured diffraction hyperbola, wherein the plurality of parameters includes:
  - a velocity of electromagnetic waves through media in which the underground pipe is located;
  - a depth of the underground pipe in the surrounding media;
  - a horizontal location of the underground pipe;
  - a size of the underground pipe;
  - a conductivity of the surrounding media;
  - a permittivity of the surrounding media;
  - a permittivity of any material or fluid within an outer surface of the underground pipe;
- producing a corrected source wavelet by acquiring a measured source wavelet and deconvolving the initial model from the measured ground penetrating data;
- simulating ground penetrating data for the initial model with the corrected source wavelet; and
- determining a cost function by running a forward model and optimizing each of the plurality of parameters using full waveform inversion to minimize the cost function, exception for the conductivity of the surrounding media.

13. The method of claim 12, further including a step of filtering out high frequency noise from the raw ground penetrating data.

14. The method of claim 12, further including a step of transforming the initial model from three-dimensional data to two-dimensional data.

15. The method of claim 12, wherein the step of creating an initial model of the subsurface object includes a least squares method for estimating the initial depth of the subsurface object in the media and the initial velocity of electromagnetic waves through media in which the subsurface object is located.

16. The method of claim 12, wherein the step of creating an initial model of the subsurface object further includes, responsive to receiving two distinct hyperbolas from a top and a bottom of the subsurface object, estimating a diameter of the subsurface object from a root mean square average of a travel time difference between peak amplitudes of the two distinct hyperbolas.

17. The method of claim 12, wherein the step of producing a corrected source wavelet includes more than one iteration of deconvolving the initial model from the measured ground penetrating data.

18. The method of claim 12, wherein the step of adjusting the plurality of parameters to minimize the cost function is performed a predetermined number of times.

19. The method of claim 12, further including a step of establishing boundary values for one or more of the plurality of parameters between which the parameters are adjusted in the step of adjusting the plurality of parameters to minimize the cost function.

20. A method for determining the cross-sectional size of an underground pipe, comprising:

operating a ground penetrating radar device with at least one antenna in a broadside orientation with respect to the underground pipe, wherein the ground penetrating radar device discharges and receives electromagnetic waves;

acquiring measured ground penetrating data from the ground penetrating radar device, wherein the measured ground penetrating data includes at least one measured diffraction hyperbola;

estimating a plurality of parameters of an initial model of the underground pipe and the surrounding media, such that the initial model produces a simulated diffraction hyperbola that is offset less than one-half a wavelength from the measured diffraction hyperbola, wherein the plurality of parameters includes:
- a velocity of electromagnetic waves through media in which the underground pipe is located;
- a depth of the underground pipe in the surrounding media;
- a horizontal location of the underground pipe;
- a size of the underground pipe;
- a conductivity of the surrounding media;
- a permittivity of the surrounding media;
- a permittivity of any material or fluid within an outer surface of the underground pipe;

transforming the initial model from three-dimensional data to two-dimensional data;

producing a corrected source wavelet by acquiring a measured source wavelet and deconvolving the initial model from the measured ground penetrating data;

simulating ground penetrating data for the initial model with the corrected source wavelet; and determining a cost function and optimizing each of the plurality of parameters to minimize the cost function, exception for the conductivity of the surrounding media.

* * * * *